US012236806B2

(12) United States Patent
Hafford et al.

(10) Patent No.: US 12,236,806 B2
(45) Date of Patent: Feb. 25, 2025

(54) LOGISTICS DRIVING SIMULATOR

(71) Applicant: United Parcel Service of America, Inc., Atlanta, GA (US)

(72) Inventors: Andrew Hafford, Atlanta, GA (US); Tim Smith, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 17/987,714

(22) Filed: Nov. 15, 2022

(65) Prior Publication Data

US 2023/0196941 A1 Jun. 22, 2023

Related U.S. Application Data

(60) Provisional application No. 63/280,435, filed on Nov. 17, 2021.

(51) Int. Cl.
*G09B 9/05* (2006.01)
*G06Q 10/08* (2023.01)
(52) U.S. Cl.
CPC ............... *G09B 9/05* (2013.01); *G06Q 10/08* (2013.01)
(58) Field of Classification Search
CPC .................................. G09B 9/05; G06Q 10/08
See application file for complete search history.

(56) References Cited

U.S. PATENT DOCUMENTS

| 11,024,193 | B1* | 6/2021 | Saxton ..................... G09B 7/06 |
| 11,164,479 | B1 | 11/2021 | Madison |
| 2017/0213474 | A1 | 7/2017 | Welles et al. |
| 2021/0349460 | A1 | 11/2021 | Huang et al. |

FOREIGN PATENT DOCUMENTS

WO 2018/224407 A1 12/2018

OTHER PUBLICATIONS

International Search Report and Written Opinion received for PCT Patent Application No. PCT/US2022/050113, mailed on Jan. 20, 2023, 17 pages.

* cited by examiner

*Primary Examiner* — Robert P Bullington, Esq.
(74) *Attorney, Agent, or Firm* — Shook, Hardy & Bacon L.L.P.

(57) ABSTRACT

The present disclosure is directed, in part, to improving existing technologies by detecting engagement of the one or more components of the logistics vehicle, which may be indicative of receiving an indication that the user is performing at least a first logistics operation. At least partially in response to the detecting, various embodiments cause display, at one or more monitors, of data where the data includes one or more instructions for the user to perform at least a second logistics operation and/or the data includes a video feed of real world scenes.

20 Claims, 27 Drawing Sheets

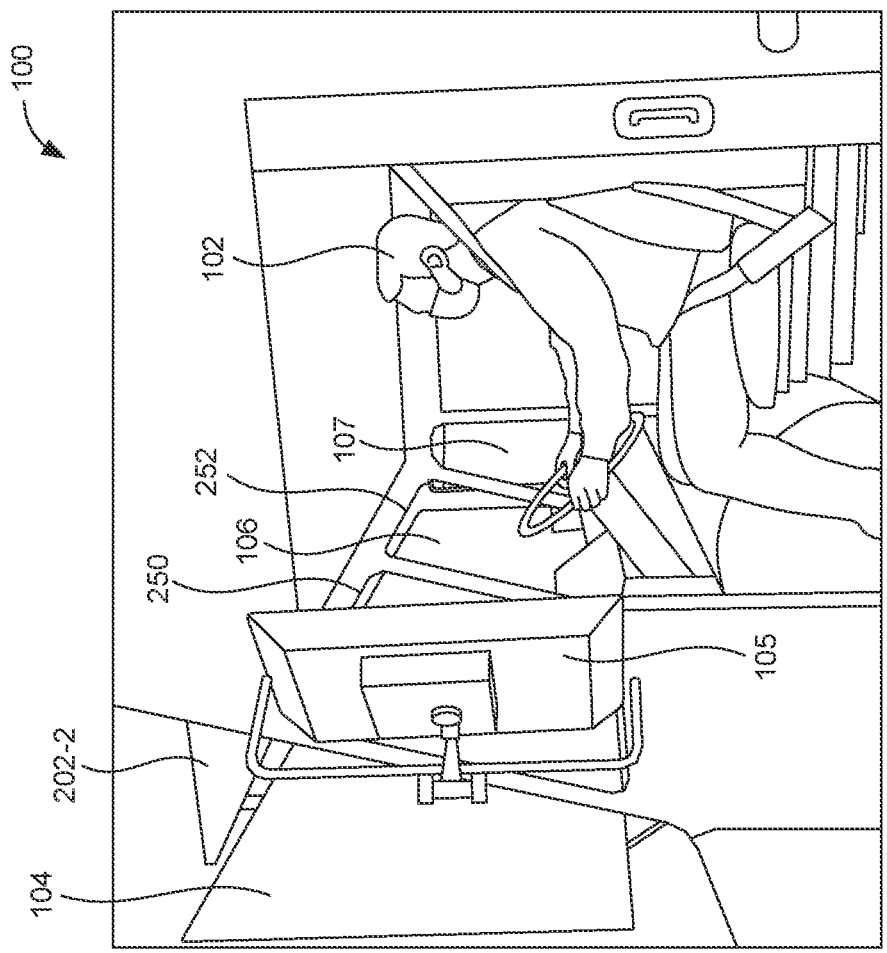
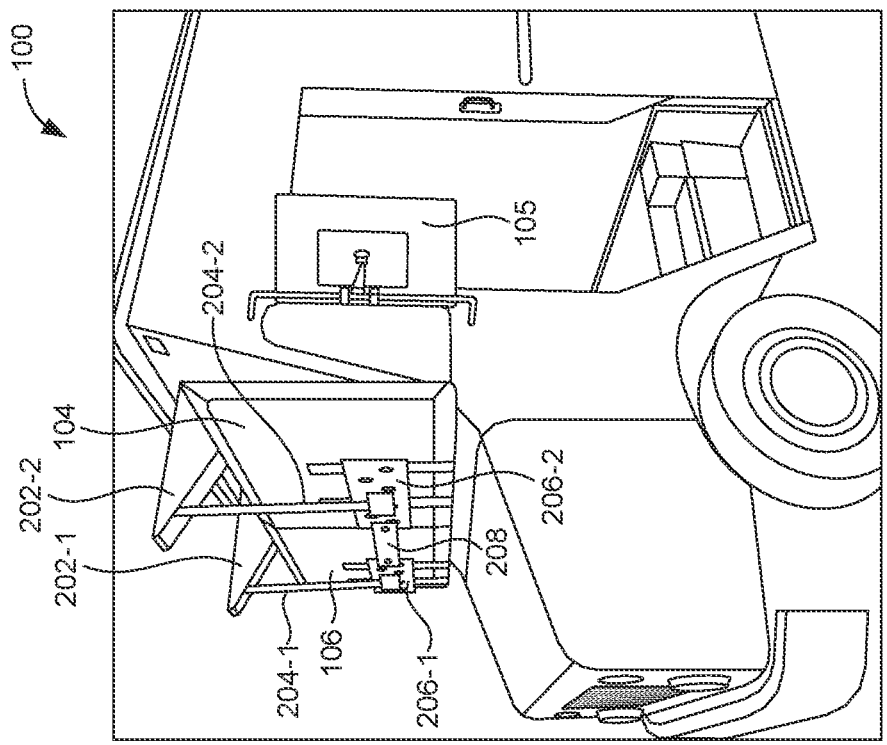
FIG. 2C.
FIG. 2B.

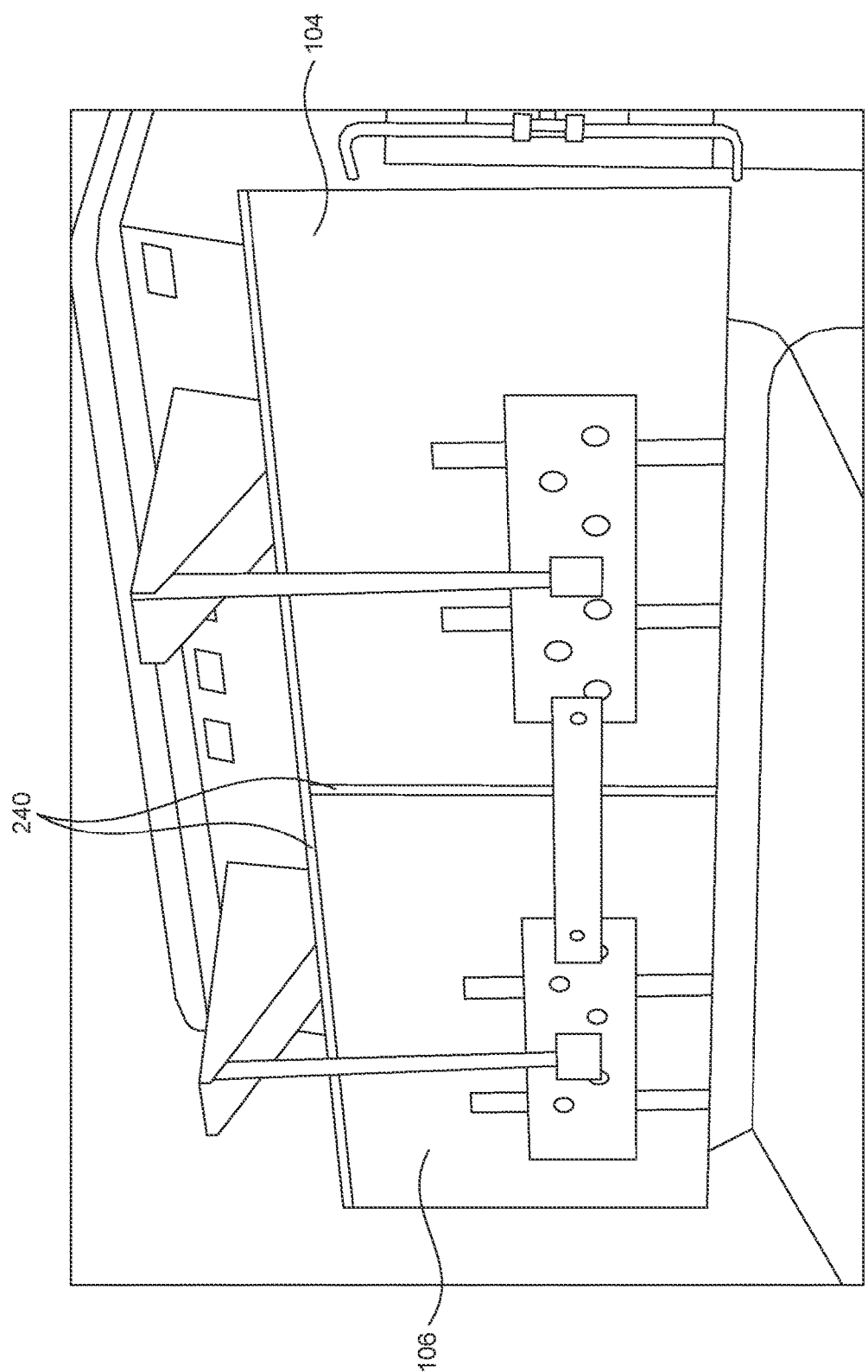

916

How often should you move your
eyes toward the front?

950 — | Keep your eyes locked | Choose | Every 2 seconds | — 952

Use the turn signal to select your answer
Turn off the signal for the next question.

Keep your eyes moving! — 956

954 — | Keep your eyes locked | Choose | Every 2 seconds |

Use the turn signal to select your answer
Turn off the signal for the next question.

Quiz

*FIG. 9I.*

LOGISTICS DRIVING SIMULATOR

BACKGROUND

Logistics personnel, such as package delivery drivers, have to engage in a variety of tasks to safely and timely deliver parcels to shipping destinations. For example, before a driver begins driving a logistics vehicle, the driver may be required to: make sure there are no hazardous objects around or under the vehicle, use a handrail to enter the vehicle, place a Delivery Information Acquisition Device (DIAD) in its cradle, fasten a seatbelt, and start up the vehicle. Once the logistics vehicle is in motion, the driver may then be required to engage in various defensive driving techniques, travel to the correct shipping destination via a route plan, select the correct parcel out of the back of the vehicle, and then drop the parcel off at the correct location in a timely manner.

Existing technologies for monitoring these logistics-based tasks have various shortcomings in terms of hardware components, functionality, accuracy, and user experience. For example, Computer Generated Imagery (CGI) simulators and existing immersive technologies (e.g., Augmented Reality and Mixed Reality), fail to, among other things, incorporate real-world logistics vehicle hardware components (e.g., a handrail, a DIAD, a seatbelt, etc.) and video that captures real world features in order to train package delivery drivers.

SUMMARY

Aspects of the present disclosure are directed, in part, to improving existing technologies via a logistics vehicle simulator that includes a logistics vehicle in order to train a user to perform one or more logistics operations. The logistics vehicle can include one or more components, such as a seatbelt, a handrail, a steering wheel, a brake pedal, a mobile device (e.g., a DIAD), a mobile device cradle, a key fob, a parking brake, a horn, a turning signal lever, a bulkhead door, an ignition component, and/or a control button, among other things. In some embodiments, the logistics vehicle includes one or more monitors (e.g., flat screen televisions) coupled to a windshield frame and/or side view mirror frame of the logistics vehicle. The one or more monitors may represent a windshield and/or side view mirror of the logistics vehicle.

Particular embodiments detect engagement of the one or more components of the logistics vehicle, which may be indicative of receiving an indication that the user is (or has) performing at least a first logistics operation (e.g., placing a DIAD in its cradle or fastening a seatbelt). At least partially in response to the detecting, various embodiments cause display, at the one or more monitors, of data where the data includes one or more instructions for the user to perform at least a second logistics operation (e.g., a defensive driving technique, such as calling out a potential hazard). The data can alternatively or additionally include a video feed of real world scenes (e.g., a recorded video stream that captures: driving past roads from the perspective of a driver, intersections, objects (e.g., pedestrians, other cars), making stops, and the like). The data can additionally include relays (e.g., augmented reality markers) that are superimposed over the video feed, which is at least partially indicative of instructing a user according to a driving technique (e.g., showing a user how far back a vehicle should be behind another vehicle).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein:

FIGS. 2A-2C are exterior views of the logistics vehicle simulator of FIG. 1, according to some embodiments.

FIG. 2E is a schematic diagram illustrating a plastic H-channel, which is configured to couple the monitors so that they do not get displaced relative to each other, according to some embodiments.

FIGS. 9A through 9j are example screenshots of different training modules, according to some embodiments.

DETAILED DESCRIPTION

Figure 1A:
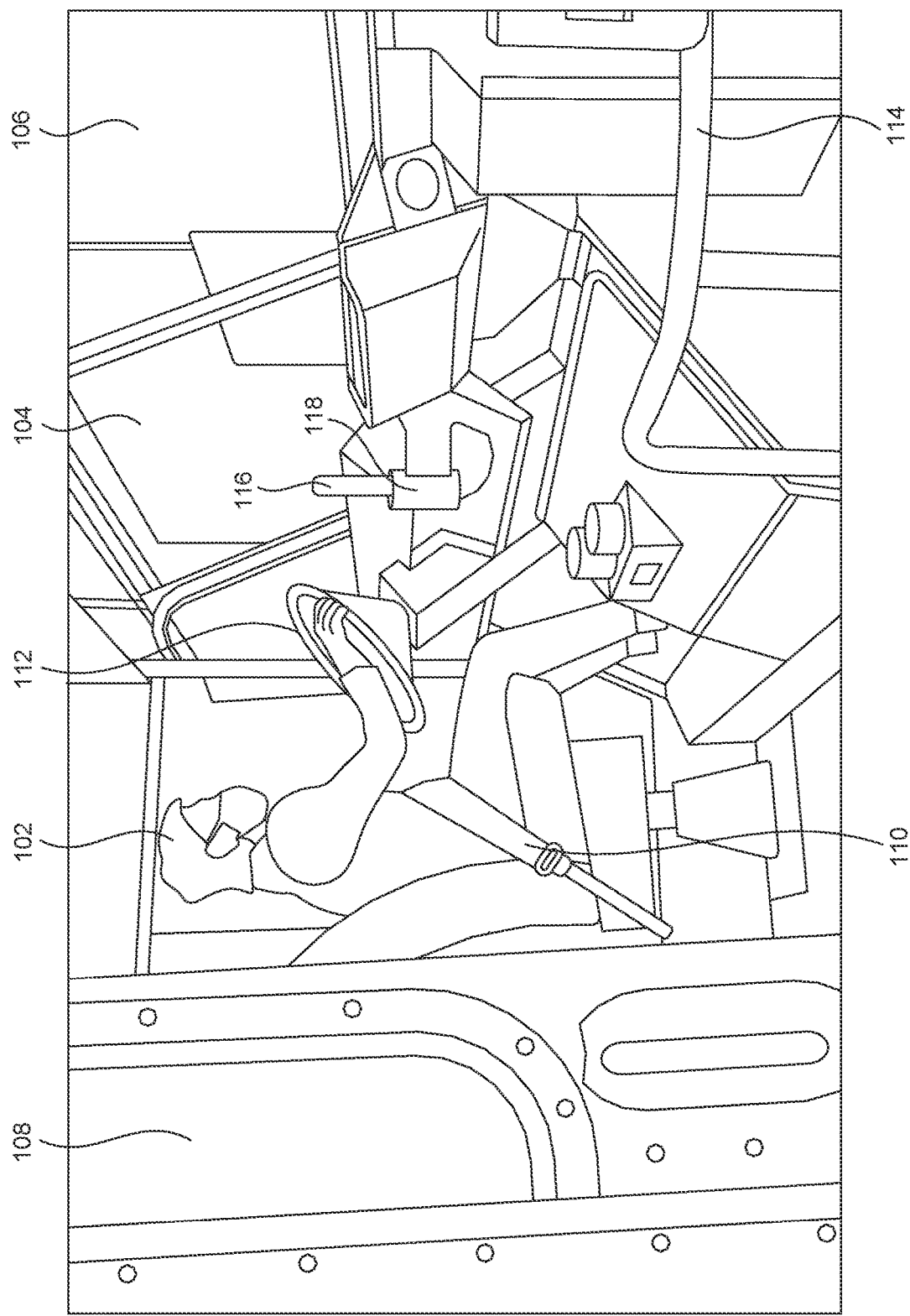
FIG. 1A is a side interior view of a logistics vehicle simulator, according to some embodiments.

The technology of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Existing logistics-based Computer Generated Imagery (CGI) simulators fail to adequately monitor logistics-based tasks and adequately train a logistics driver, as described above. These technologies are digital-based simulators that contain no real-world logistics vehicle hardware components to train logistics drivers. For example, these technologies essentially instruct package delivery drivers how to safely navigate a street by causing display of such instructions. The users may responsively engage in a video game-like simulation by providing an input via a mouse click or other generic input device, which indicates whether the user has received such instructions, and whether the user has engaged in and understands (e.g., via a questionnaire) the safety protocols. However, these technologies fail to incorporate real world logistics vehicle components, such as a handrail, a DIAD, a DIAD cradle, a seatbelt, a steering wheel, a key ignition, and the like.

Because of these shortcomings with CGI simulation technologies, the user experience and accuracy is negatively impacted. For example, without a handrail placed in a vehicle, these existing technologies cannot accurately gauge if the user knows where the handrail is in the vehicle and whether the user uses it properly before entering/exiting a vehicle. These technologies also only provide virtual simulations of a driving environment and no video feeds of real world environments. Accordingly, these technologies fail to accurately simulate real-world logistics operations, thereby negatively effecting the user experience. Moreover, these technologies fail to employ adequate functionality for monitoring logistics-based tasks. For example, the training modules of these technologies are static in nature and only test driver knowledge of basic concepts, such as basic driving knowledge, and the like, thereby negatively affecting the user training experience.

Existing immersive technologies also fail to monitor logistics-based tasks and train logistics personnel. Immersive technologies merge the physical world with a digital or simulated reality. Examples of immersive technologies included Augmented Reality (AR), Virtual Reality (VR), and Mixed Reality (MR). Currently these technologies provide a rich gaming experience for users, provide training or education to users, and immersive E-Commerce and shopping tools, among other things. However, these technologies currently lack the functionality for training logistics drivers and lack the necessary hardware components for such training, such as a handrail, a mobile device, such as a DIAD, a corresponding cradle, a seatbelt, a steering wheel, a key ignition, and the like. Consequently, these technologies do not monitor logistics-based tasks to train logistics personnel.

Various embodiments of the present disclosure provide one or more technical solutions to these, and other, technical problems described above. For instance, particular embodiments improve CGI simulator technologies. Unlike these technologies, particular embodiments contain real-world logistics vehicle hardware components to train logistics drivers, such as a handrail, a DIAD, a DIAD cradle, a seatbelt, a steering wheel, a key ignition, and the like. Accordingly, the user experience and accuracy is improved. For example, because embodiments include a handrail placed in a vehicle, particular embodiments can accurately gauge if the user knows where the handrail is in the vehicle and whether the user uses it properly before entering/exiting a vehicle. Various embodiments also employ video feeds of real world environments. Accordingly, particular embodiments accurately simulate real-world logistics operations, thereby improving the user training experience.

Moreover, particular embodiments employ improved functionality with respect to training modules and graphical format overlays relative to CGI simulation technologies. For example, various embodiments include dynamic training modules for: various defensive driving techniques, pre-driving activities (e.g., making sure there are no kids around the vehicle, handrail detection, seatbelt detection, DIAD placement detection, vehicle start-up detection, etc.), as well as post-driving activities (e.g., ensuring that the user has made a correct stop, ensuring that the user has selected the correct package and timely delivered it to the correct address). In another example, various embodiments improve these technologies by superimposing objects (e.g., via AR highlight overlays) over video feed of pedestrians or other potential hazards depending on the training module, thereby improving the training experience. For example, particular embodiments may superimpose a bright color highlight around a video object indicating a pedestrian, which indicates that the user should perform some action, such as honk a horn, press the brake, etc.

Particular embodiments also improve existing immersive technologies, especially immersive technologies for training. This is because particular embodiments include functionality for training logistics drivers and include the necessary hardware components for such training, such as a handrail, a DIAD, a DIAD cradle, a seatbelt, a steering wheel, a key ignition, and the like. Consequently, these embodiments monitor logistics-based tasks to train logistics personnel, unlike existing immersive technologies.

FIG. 1A is a side interior view of a logistics vehicle simulator 100, according to some embodiments. The logistics vehicle simulator 100 is configured to monitor and detect the engagement (e.g., completion) of logistics-based tasks to train a package delivery driver. The logistics vehicle simulator 100 includes a logistics vehicle that includes two monitors 104 and 106, a DIAD 116, a DIAD cradle 118, a steering wheel 112, a driving operator 102, a bulkhead door 108, a seatbelt 110, and a handrail 114, among other components not shown. Although the logistics vehicle is illustrated in FIG. 1A as a particular delivery van, it is understood that the logistics vehicle can be any suitable type of vehicle, such as a tractor trailer, a truck, a car, an aircraft, or the like. Each component of the logistics vehicle simulator 100 and the logistics vehicle itself is a particular machine or manufacture.

In some embodiments, the monitors 104 and 106 are individual television monitors (e.g., flat screen 65 inch monitors) that represent what the driving operator 102 views when looking out of a windshield while driving a logistics vehicle (also referred to herein as a "package car"). As such, these monitors 104 and 106 are configured to be placed in (or be viewed through) the apertures that define a windshield, and couple to the edges of the windshield frames (illustrated as 250 and 252 of FIG. 2D). In some embodiments, the monitors 104 and 106 are configured to display real world video feeds and AR overlays in order to engage in various defensive driving techniques, as described in more detail herein with respect to FIGS. 9A through 9H.

Some embodiments perform human eye tracking functionality to determine whether the driving operator 102 is looking in the correct place, as part of a determination of whether the user is conforming to one or more training modules. For example, certain training modules require that the user keep their eyes moving across the screen every threshold quantity of time without looking out of the side view monitors 105 and 107 (described in FIG. 2A and FIG. 8). Eye tracking refers to the process of measuring where users look, known as the point of gaze. Such functionality can be performed by an eye tracker (e.g., a camera embedded into the monitor 104 or eye tracking glasses) located in the logistics vehicle simulator 100 that records the position of the eyes and the movements they make. For example, a near-infared light is propagated towards the center of a user's eyes (pupil center), causing detectable reflections in both the pupil and the cornea. A vector may represent these reflections, where the vector represents the distance between the pupil and the outer edge of the cornea at different time stamps (e.g., Pupil Center Corneal Reflection (PCCR)) to detect movement of the eyes. In other words, the center of the eye (the pupil center) is tracked in relation to the position of the corneal reflection. The relative distance between the two areas allows the calculation of the direction of the gaze. Some embodiments additionally or alternatively use object detection algorithms to detect where the user is looking, as described in more detail herein.

Some embodiments create a data structure, such as a hash map, in order to map each place (corresponding to a vector of coordinates) a user is looking at to a particular area. For example, a first distance eye tracking footprint may indicate that the user is looking at the rear view mirror, and a second distance eye tracking footprint may indicate that the user is looking at a side view mirror (e.g., the side view monitor 105). Accordingly, particular embodiments can map the user's real-time eye movements to places in the logistics vehicle that the user is looking at in order to give tailored instructions, such as "look away from the side view mirror" or the like. Additionally or alternatively, some embodiments generate a heat map that indicates where the user has looked the most often over a specific duration of time. For example, the hotter (e.g., the color red) or more concentrated a color is, may represent where, in a logistics vehicle the user looked the most. Such heat maps may be used by supervisors or a processor to cause certain instructions to be presented to the user, such as "you looked at the side view mirror too often."

The DIAD 116 is configured to be placed in the DIAD cradle 118, which holds the DIAD 116. The DIAD cradle 118 mounts to the dashboard of the logistics vehicle simulator 100. In some embodiments, the DIAD 116 is configured to allow hands-free operation and displays a map that shows the operating driver 102's route and where exactly to stop along the route. Alternatively or additionally, these devices emit auditory signals to notify drivers when to slow for a delivery or pickup stop. Alternatively or additionally, these devices keep track of all the packages that the driving operator 102 is responsible for (e.g., all of the packages located in the driving simulator 100) and allow consignees to sign for receiving their parcels. It is understood that the DIAD 116 and the DIAD cradle 118 may represent any suitable mobile device (e.g., a mobile phone or tablet) (and corresponding cradle) that collects consignee signatures, stores parcel information (e.g., package ID, package attributes (e.g., height, weight, etc.), consignee addresses, route number, consignee ID, etc.), and/or scans code indicia (e.g., bar codes).

In some embodiments, the DIAD 116 includes a first contact at the bottom. In some embodiments, a "contact" is conductive material which helps electric current pass between two or more objects (e.g., the DIAD 116 and the DIAD cradle 118). For example, a first contact can be a pin and a second contact can be a female aperture configured to receive the pin. Additionally, in some embodiments the interior of the bottom of the cradle 118 includes a second contact. Accordingly, for example, in response to the first contact touching the second contact (or the first contact no longer touching the second contact), particular embodiments cause an auditory control signal to be emitted, such as "DIAD" and/or a message to be sent to a display of the monitors 104 and 106, such as, "the DIAD has been properly placed in the cradle" (in response to the touching of the first and second contacts). In another example, such message may be "the DIAD has been removed from the cradle" (in response to the first and second contacts no longer touching). Any additional or alternative sensor can be used to detect whether the DIAD 116 has been placed in (or removed from) the cradle 118, such as a touch sensor, magnetic sensor, and the like.

In some embodiments, the steering wheel 112 is configured to radially rotate in response to driving operator 102 input, which causes the monitors 112 and 106 to change display indicative of the driving operator 102 turning left, right, or otherwise turning a logistics vehicle. Alternatively or additionally, an auditory signal may be produced, such as "driver turning left," or the like. In other embodiments, the steering wheel 112 is not configured to cause the monitors 104 and 106 to change display.

Figure 1B:
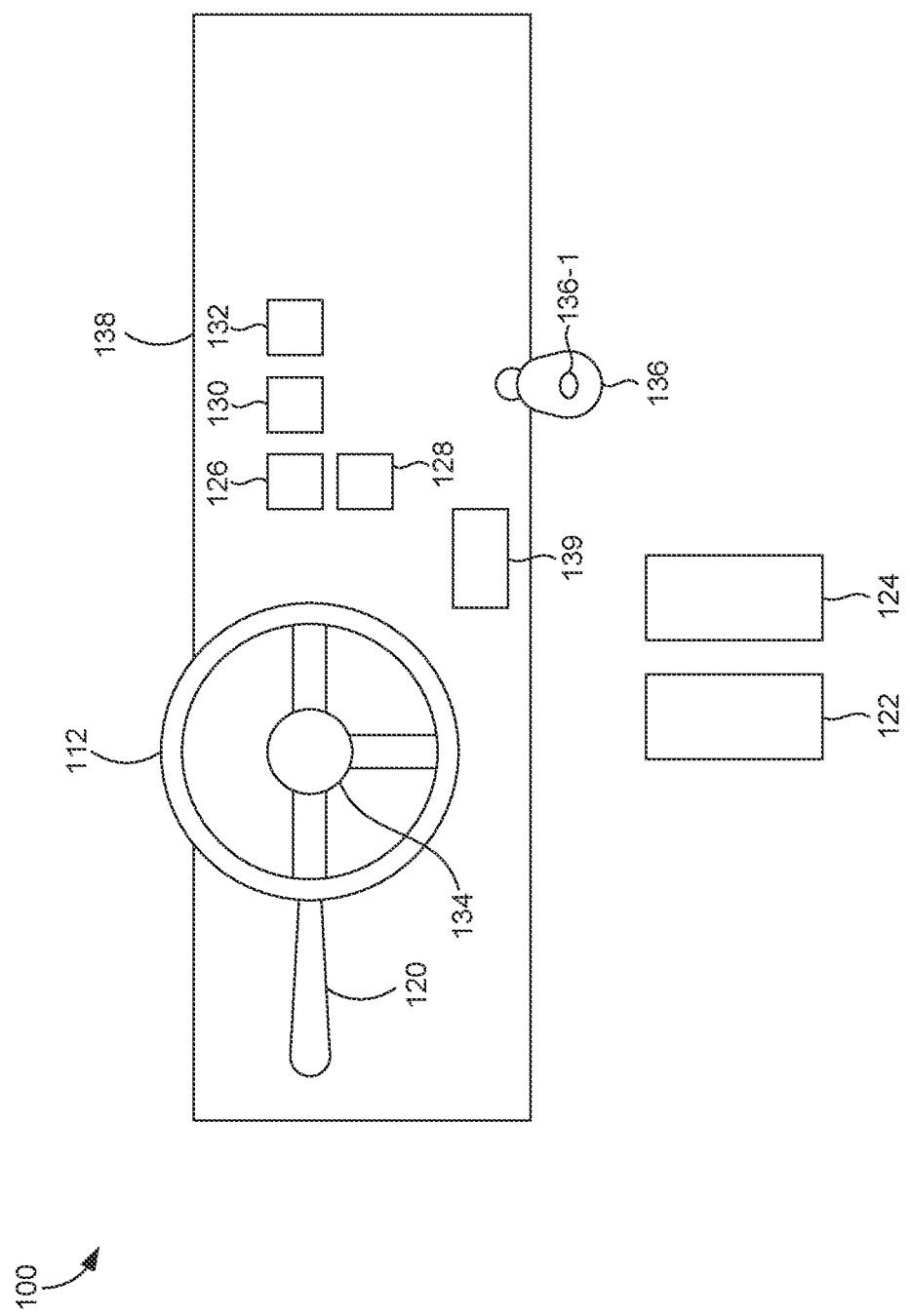
FIG. 1B is frontal facing interior view of the logistics vehicle simulator of FIG. 1A, according to some embodiments.
Figure 1C:
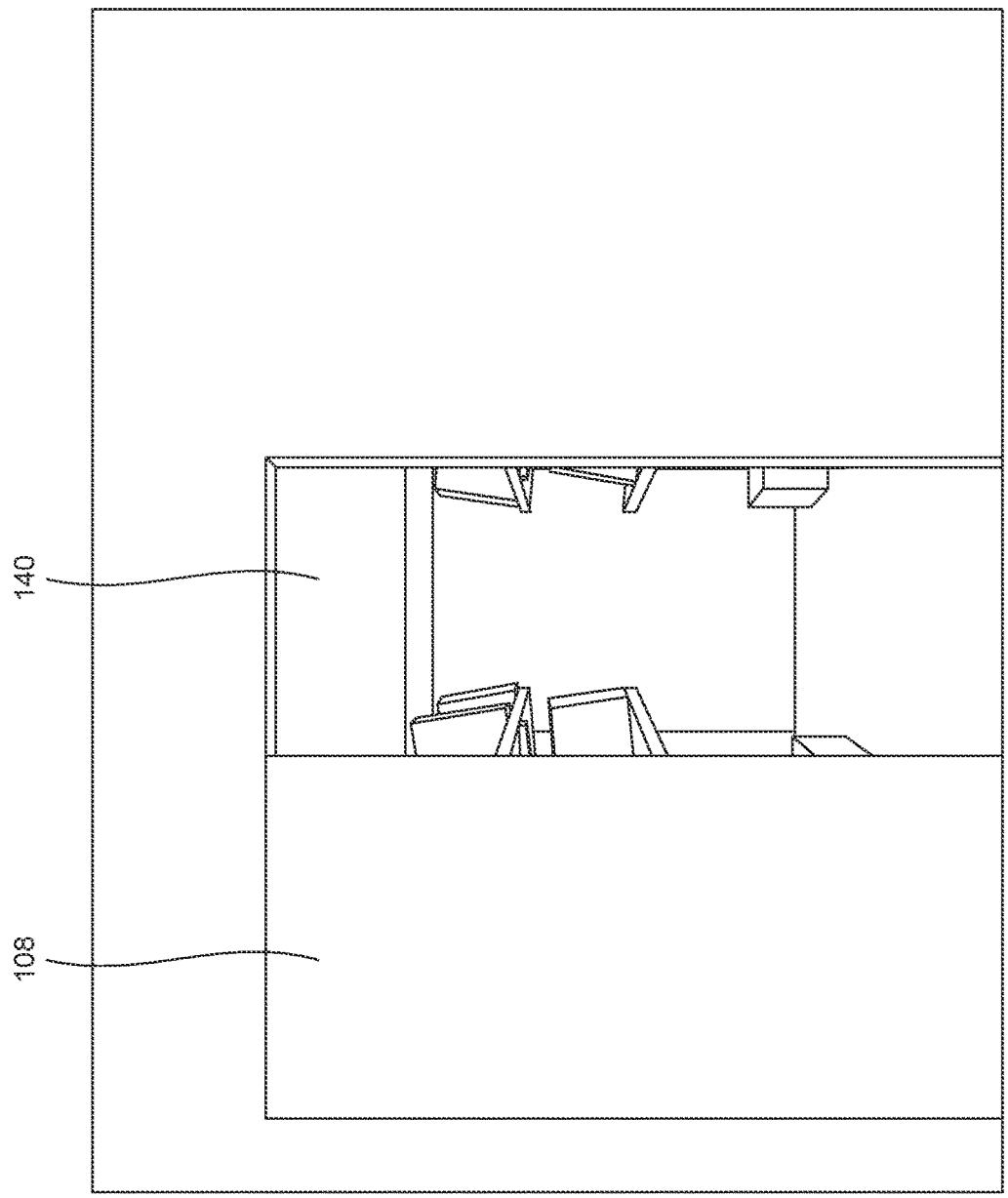
FIG. 1C is a rear interior view of the logistics vehicle simulator of FIG. 1A, according to some embodiments.

The bulkhead door 108 is a door that separates the driver cabin area or cockpit from the rest of the vehicle, such as a bed of the vehicle (e.g., 140 of FIG. 1C). In some embodiments, the bulkhead door 108 is configured to be transversely slide in a plane parallel to the floor or roof of the vehicle in order to open and close. In some embodiments, the bulkhead door 108 includes a magnetic sensor (e.g., a Hall switch or Reed switch) that is able to detect whether the bulkhead door 108 has opened or closed. For example, these sensors can detect the linear motion of the bulkhead door 108 by detecting a change in magnetic field due to the sliding of the bulkhead door 108.

The seatbelt 110 is configured to be fastened such that the driving operator 102 is secured to the driver seat. The seatbelt 100 may be built or function in accordance with any seatbelt design and manufacturing standards. In some embodiments, the seatbelt 100 includes a male end that includes a first contact and the seatbelt 100 further includes a female end (a slot) that includes another second contact such that when the first contact touches the second contact, it breaks a ground, thereby causing a control signal to be transmitted to a display of the monitors 104 and 106 indicating that the seatbelt is on. In other embodiments, the control signal may cause an auditory output, such as "seatbelt on" Likewise, in some embodiments, when there is no connection made between the first and second contacts, there is a ground signal, which causes a control signal to have an audio output or be transmitted to a display of the monitors 104 and 106 indicating that there is no seatbelt. A ground signal (or "signal grounding") is a reference point from which that signal is measured, due to the inevitable voltage drops when current flows within a circuit. As described in more detail below, such circuits can be included in IPAC 2 circuit boards, Makey Makey or the like with respect to keyboard emulators in order to complete a ground signal and send an asking message to provide the monitors 104 and 106 the appropriate message (e.g., "seatbelt on").

Alternatively or additionally, in some embodiments the seatbelt 110 includes a telematics sensor, which detects whether a user has fastened the seatbelt. For example, the telematics sensors may detect a pressure or strain above a threshold at the seatbelt 110, which triggers a control signal to be transmitted through a wired connection to a display memory of the monitors 104 and 106 so that a processor can execute an instruction to cause display of a message that reads "seatbelt on," (or "seatbelt off" when the strain is below the threshold). It is understood that the control signal can alternatively or additionally produce auditory outputs, such as "seatbelt on," or the like.

The handrail 114 is configured to be clutched, by the driving operator 102, in order to exit and/or enter the logistics vehicle. In some embodiments, the handrail 114 is alternatively (or another handrail may additionally) be located at the driver's side door exit. When the driving operator 102 uses the handrail 114 to enter or exit the logistics vehicle, the force applied by the driver operator's hands to clasp the handrail 114 greatly reduces the force on the driving operator 102's knee joints and also provides a steady base when stepping down (or up from) the logistics vehicle so that the driving operator 102 does not get hurt. Accordingly, it may be desirable to detect whether a user has clasped the handrail 114 for their safety.

In some embodiments, the handrail 114 includes a sensor (e.g., a resistance sensor or a lamp sensor) with a piece of tape covering the sensor to detect whether a user has grasped the handrail 114. Accordingly, if the clasp or touch of the sensor is over a threshold (e.g., a resistance threshold), a ground or other control signal is transmitted to a display memory of the monitors 104 or 106 (and/or produce an auditory signal) to indicate that the user has used the handrail. In some embodiments, in response to such threshold being met, particular embodiments initiate one or more training modules to guide the driving operator 102 in a step-by-step process to complete various tasks, such as placing a DIAD in a DIAD cradle, fasten the seatbelt 102 over the driving operator 102, start a logistics vehicle, and/or the like. In other words, in some embodiments, the detecting that the driving operator 102 has clasped the handrail 114 triggers or initiates one or more (e.g., all) training sessions so that the driving operator 102 can engage in training.

FIG. 1B is frontal facing interior view of the logistics vehicle simulator 100 of FIG. 1A, according to some embodiments. The logistics vehicle simulator 100 includes the turn signal lever 120, the steering wheel 112, the brake petal 122, the gas pedal 124, the dashboard 130, which includes the engine start button 126, the engine stop button 128, the control button 130, and the parking brake/emergency brake 139, the bulkhead door button 132, and the key fob 136. In some embodiments, the control button 130 is connected to a momentary switch in the dashboard 138. This may be used to move through logistics operations or activities and navigate a user interface menu of training modules. For example, in response to detecting that the user has pressed the control button 130, some embodiments cause presentation of or switch screenshots corresponding to FIGS. 9A through 9i.

In some embodiments, the steering wheel 112 includes a horn 134, which is configured to produce an auditory sound in response to detecting that the horn 134 has been pressed. In some embodiments, the horn 134 includes a contact and circuit connection such that when the horn is pushed over a particular threshold (e.g., by the driving operator 102), the circuit closes, which responsively causes the auditory sound. Alternatively or additionally, the horn 134 may include a pressure sensor (e.g., a touch or tactile sensor) that activates an auditory signal in response to experiencing a capacitance over a threshold. The horn 134 may be useful in situations where training modules may require that driving operators use their horn in certain situations, for a particular duration, or a certain amount of times.

The turn signal lever 120 is configured to be displaced in an upward motion (towards the ceiling of the logistics vehicle) or in a downward motion (toward the floorboard of the logistics vehicle). In response to detecting the particular displacement direction (up or down), particular embodiments infer that the user intends to turn left or right and cause display to the monitors 106 and 108 or auditory signals, such as "turned left" or switches video feeds indicating that the operator 102 has turned left or right. For example, a video feed may indicate, from a driver's perspective that the operator 100 is driving straight. In response to detecting, signal lever 120 displacement in a downward motion and/or the steering wheel has been radially rotated in a counter-clockwise manner, particular embodiments switch the video feed indicative of the operator 100 turning left and traversing another street. Alternatively or additionally, a user can make various user interface selections based on displacement of the turn signal lever 120, as described in more detail below.

The brake pedal 122 and the gas pedal 124 are configured to be displaced or depressed by the feet of the operator 100. In some embodiments, these pedals include pressure sensors or other sensors to detect depression or displacement above a threshold. In response to the detection, particular embodiments cause display (e.g., to the monitors 106 and 108) certain indicia, such as the speed of the operator in miles per hour (MPH), or other indicia, such as "too fast," "stopped too late" and the like. Alternatively or additionally, video feeds can be changed in response to the detection. For example, in response to detecting that the gas pedal 124 has been depressed over a threshold, particular embodiments directly and proportionately speed up the video feed (e.g., fast forwarding the video feed), which is indicative of the user going faster. In another example, in response to detecting that the brake pedal 122 has been depressed over a threshold, particular embodiments directly and proportionately slow down the video feed, which is indicative of the user slowing down or stopping.

The key fob 136 is a device or remote control with a chip (e.g., and an antenna) inside to perform functions in response to a detection of the depression of the button 136-1. In some embodiments, in response to detecting that the button 136-1 has been depressed, the antenna of the key fob 136 transmits a wireless signal to a computing device (e.g., the analysis computing entity 05 of FIG. 11), which triggers one or more auditory or display signals, such as initiating the training process or other functions, as described in more detail below.

The parking brake interface 139 is an interface feature (e.g., a handle) that is configured to be displaced (e.g., pulled) for certain logistics training operations to ensure that the operator 100 has caused the corresponding parking brake to engage. The parking break is a backup braking system independent of the brake pedal 122 (e.g., hydraulic brakes) to ensure a logistics vehicle does not roll or otherwise move. In response to detecting that the parking brake interface 139 has been displaced over a threshold (e.g., via a pressure sensor), some embodiments send a control signal to the monitors 106/108 and/or via auditory interface to indicate that the parking brake has been engaged. This may be useful in training modules where, for example, drivers are parking on a hill, as indicated in the video stream within the monitors 106 and 108 and the logistics operation instruction is to properly part the logistics vehicle on the hill.

In some embodiments, the "engine start" and "engine stop" buttons 126 and 128 (each of which are also referred to as an "ignition component") are interfaces for switches to activate (turn on) or deactivate (turn off) the simulator 100, which is indicative of turning an ignition or otherwise starting up a logistics vehicle or initiating driver training via the vehicle logistics simulator 100. For instance, in response to detecting that the engine start button 126 has been displaced (indicative of the operator 100 pressing the button 126), particular embodiments activate a training module or otherwise cause instructions to be generated at the monitors 106 and 108. In some embodiments, in response to detecting a depression of the button 136-1, particular embodiments instruct (via auditory or display) the operator 100 to press the engine start button 126. In some embodiments, the "control button 130" alternatively is used in lieu of the engine start and stop buttons 126 and 128.

The bulkhead door button 132 is an interface feature that causes the bulkhead door 108 to automatically open. In response to detecting that the bulkhead door button 132 has been displaced (via the operator 102 pushing the button 132), particular embodiments send a control signal to cause the bulkhead door 108 to open, as described, for example, with respect to FIG. 1C. FIG. 1C is a rear interior view of the logistics vehicle simulator of FIG. 1A, according to some embodiments. FIG. 1C illustrates the bulkhead door 108, as well as the interior 140 of the bed of the logistics vehicle simulator 100.

Some embodiments are able to detect other logistics-based tasks based on the opening and/or closing of the bulkhead door 108. For example, some embodiments can detect whether the driving operator 102 has selected the correct package from the back of the vehicle in the interior 140. In an illustrative example, particular embodiments can detect when the bulkhead door 108 opens (inferring that the user has entered the back of the vehicle where the parcels are located), then closes (inferring that the user has picked a parcel), detect that the driving operator 102 has used the handrail 114 (inferring that the user has exited the vehicle), and detect a scanning of the parcel (inferring that the parcel has been dropped off), where the scanning information indicates the ID of the specific parcel. In this way, particular embodiments can gauge and monitor the time it takes for the delivery operator 102 to drop of the parcel, whether the correct parcel is picked, and whether proper techniques or procedures were followed.

It is understood that additional or alternative sensors can be utilized to detect and monitor whether the driving operator 102 has engaged in various tasks. For example, in some embodiments, the logistics vehicle includes an object detection camera to detect whether the driving operator 102: has placed the seatbelt 110 on, has clutched the handrail 114, has placed the DIAD 116 in its cradle 118, has opened the bulkhead door 108, and the like. In an illustrative example of object detection functionality, particular embodiments use one or more machine learning models (e.g., a Convolutional Neural Network (CNN)) to generate a bounding box that defines the boundaries and encompasses a computer object representing a feature (e.g., the handrail 114, the steering wheel 112, the seatbelt 110, etc.). These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects.

In some embodiments, one or more machine learning models can be used and trained to generate tighter bounding boxes for each object. In this way, bounding boxes can change in shape and confidence levels for classification/prediction can be increased based on increased training sessions. For example, the output of a Convolutional Neural Network (CNN) or any other machine learning model described herein can be one or more bounding boxes over each feature of an image (corresponding to each feature inside the logistics vehicle simulator 100), where each bounding box includes the classification prediction (e.g., this object is a DIAD cradle) and the confidence level (e.g., 90% probability).

In an example illustration of how machine learning models can be used to classify images or objects within images, one or more neural networks (e.g., CNNs) can be used. In some embodiments, various categories or labels can first be identified and run through training, such as images that contain "seatbelts," "handrails," "steering wheels," and the like. The neural network can include a convolutional layer, a pooling layer, and a fully connected layer. The machine learning model neural network may be fed or receive as input one or more images of geographical areas at the convolutional layer. Each input image can be transformed into a 2-D input vector array of values, such as integers of ones and zeroes. Each value represents or describes a particular pixel of the image and the pixel's intensity. For instance, each line or edge of a street in the image can be denoted with a one and each non-line can be represented with zeroes. The convolutional layer utilizes one or more filter maps, which each represent a feature (e.g., a handrail) of the input image (e.g., the inside of a logistics vehicle). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature.

In particular embodiments, the pooling layer reduces the dimensionality or compresses each feature map by picking a window size (i.e., a quantity of dimensional pixels that will be analyzed in the feature map) and selecting the maximum value of all of the values in the feature map as the only output for the modified feature map. In some embodiments, the fully connected layer maps votes for each pixel of each modified feature to each classification or label (e.g., whether the feature is a user grabbing a handrail or fastening a seatbelt, etc.). The vote strength of each pixel is based on its weight or value score. The output is a score (e.g., a floating point value, where 1 is a 100% match) that indicates the probability that a given input image or set of modified features fits within a particular defined class. After the first picture is fed through each of the layers, the output may include a floating point value score for each classification type that indicates, for example, user grabbing handrail: 0.21, user putting DIAD in cradle: 0.70," and user fastening seatbelt: 0.90," which indicates that the user is likely fastening a seatbelt. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen overtime as more training images and baseline data sets are fed into the learning models so that classification can occur with higher prediction probabilities.

Figure 2A:
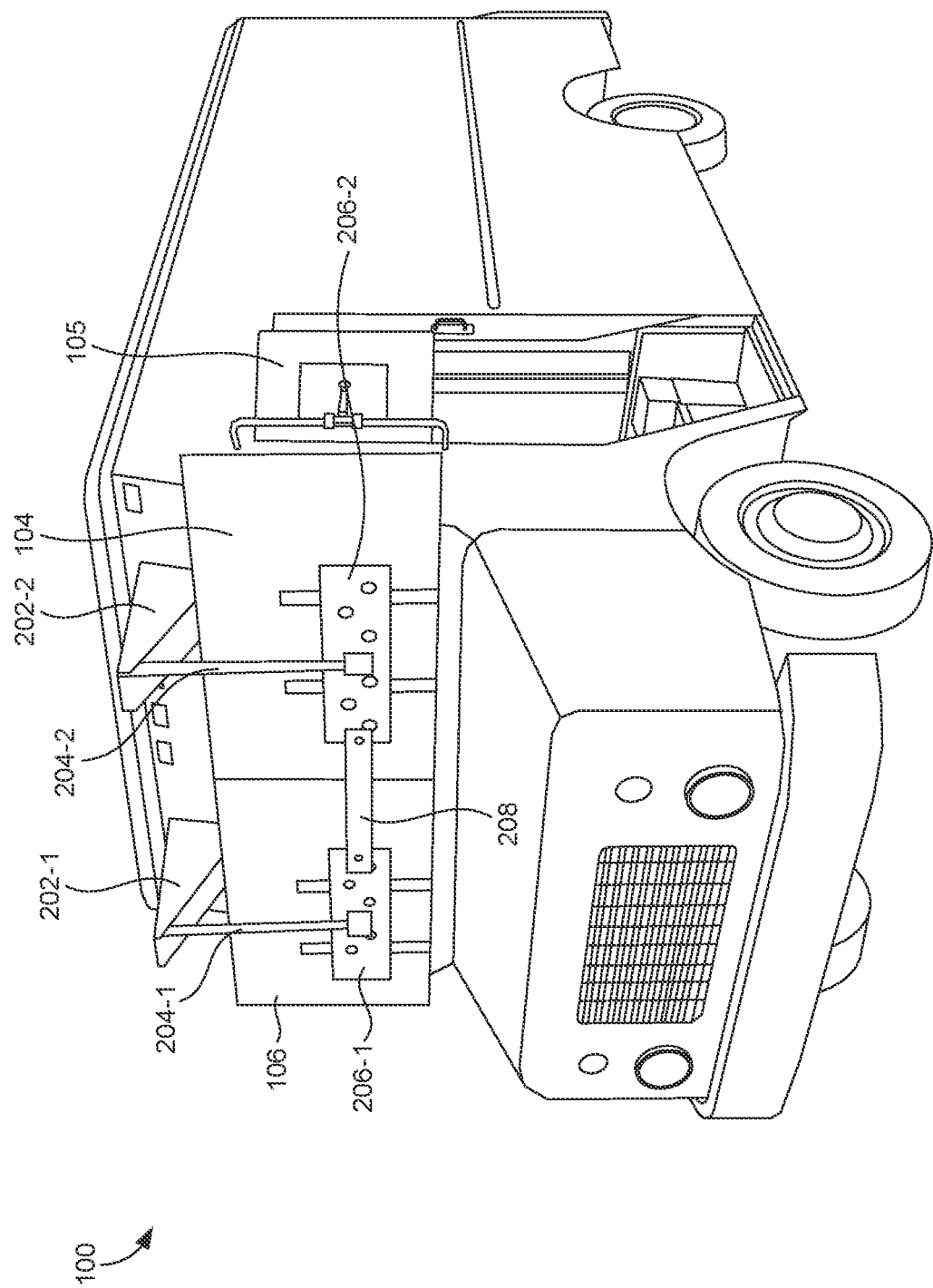

FIG. 2A is an exterior frontal view of the logistics vehicle simulator 100 of FIG. 1A, according to some embodiments. FIG. 2 illustrates a mounting system that includes two arms 204-1 and 204-2, which extend from the windshield monitor brackets 202-1 and 202-2 all the way down to the monitor brackets 206-1 and 206-2. The monitor bracket 206-2 is configured to fasten to and hold the monitor 104 in place. Likewise, the monitor bracket 206-1 is configured to fasten to and hold the monitor 106 in place. The anti-sway bracket 208 is configured to keep the monitors 104 and 106 from swaying or otherwise moving relative to each other and/or move at all by fastening to the monitor 104 at a first end and fasten to the monitor 106 at a second end. The logistics vehicle simulator 100 also includes the side view monitor 105, which is identical or similar to the monitors 104 and 106, except that it is smaller in size. The side view monitor 105 is configured to replace a side view mirror in the logistics vehicle simulator 100 such that it resembles what the driving operator 102 views when looking out of a side view mirror.

Figure 2D:
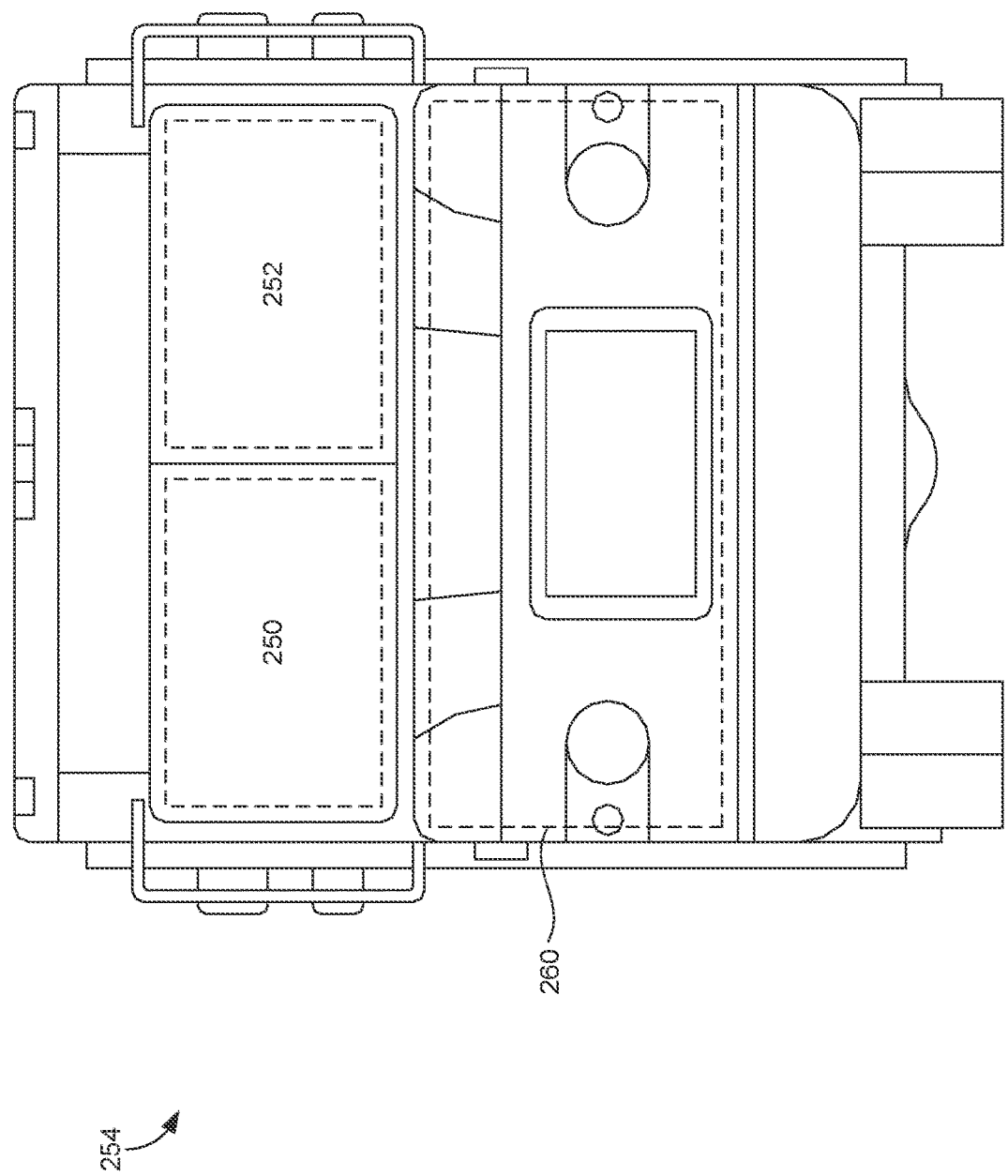
FIG. 2D is a shell of the front portion of the logistics vehicle simulator of FIG. 1A, according to some embodiments.

FIG. 2B is a frontal side view of the logistics vehicle simulator 100 of FIG. 2A, including the mounting system. FIG. 2C is a side view of the logistics vehicle simulator 100 of FIG. 2A, including the mounting system. FIG. 2D is a shell or frame 254 of the front portion of the logistics vehicle simulator 100. The shell 254 illustrates the window frames 250 and 252, which define corresponding apertures and which are configured to couple to the monitors 104 and 106 to allow the operator 102 to view the monitors 104 and 106, such as illustrated with respect to FIG. 2B and FIG. 2C. As illustrated in FIGS. 2B and 2C, in some embodiments, the monitors 104 and 106, though "coupled" to the windshield frames 250 and 252, they may, in fact, not be touching at least a portion of the windshield frames 250 and 252. Accordingly, the term "coupled" may mean that components are fastened to each other (e.g., via screws or bolts), touching or abutting against each other, are close to each other, or are otherwise associated with each other.

Referring back to FIG. 2D, the shell 254 illustrates the engine compartment 260, which is a volumetric space that, while traditionally is configured to host engine components, is configured to house or host one or more computing devices, such as the analysis computing entity 05, computing device 10, or any other device with a processor that is configured to execute computer-readable program instructions, as described in more detail herein.

FIG. 2E is a schematic diagram illustrating a plastic H-channel 240, which is configured to couple the monitors 104 and 106 so that they do not get displaced relative to each other. In this way, designers can install the plastic H-channel 240 across the top of both televisions to secure them in place.

Figure 3A:
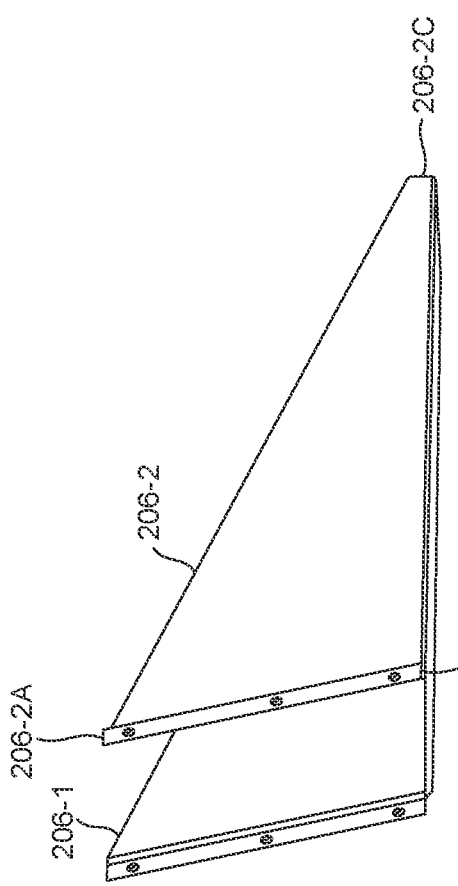
FIGS. 3A-3D are varying views of the windshield monitor brackets of FIG. 2, according to some embodiments.
Figure 3C:
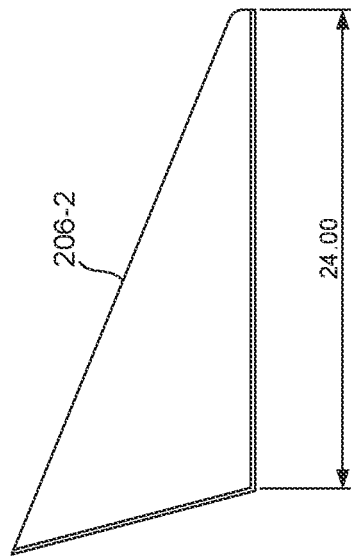
Figure 3B:
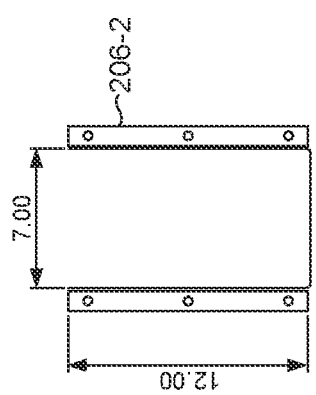

FIGS. 3A through 3C are schematic diagrams illustrating the windshield monitor brackets 202-1 and 202-2 of the mounting system of FIG. 2, according to some embodiments. In some embodiments, the windshield monitor brackets 202-1 and 202-2 are custom built using an aluminum bender and drill press. In some embodiments, the dimensions match the angle of the logistics vehicle 100's windshield (before it has been replaced with the monitors 104 and 106). In some embodiments, the windshield monitor brackets 202-1 and 202-2 allow space for the monitors 104 and 106 to hang vertically in front of the windshield with a standard ceiling mount. FIG. 3A illustrates a side view of the windshield monitor brackets 202-1 and 202-2. FIG. 3B illustrates that in some embodiments, the width of the windshield monitor bracket 206-2 is 7 inches and the length from the first end 206-2A to the second end 206-2B is 12 inches. FIG. 3C illustrates in some embodiments that the length from the second end 206-2B to the third end 206-2C is 24 inches.

Figure 3D:
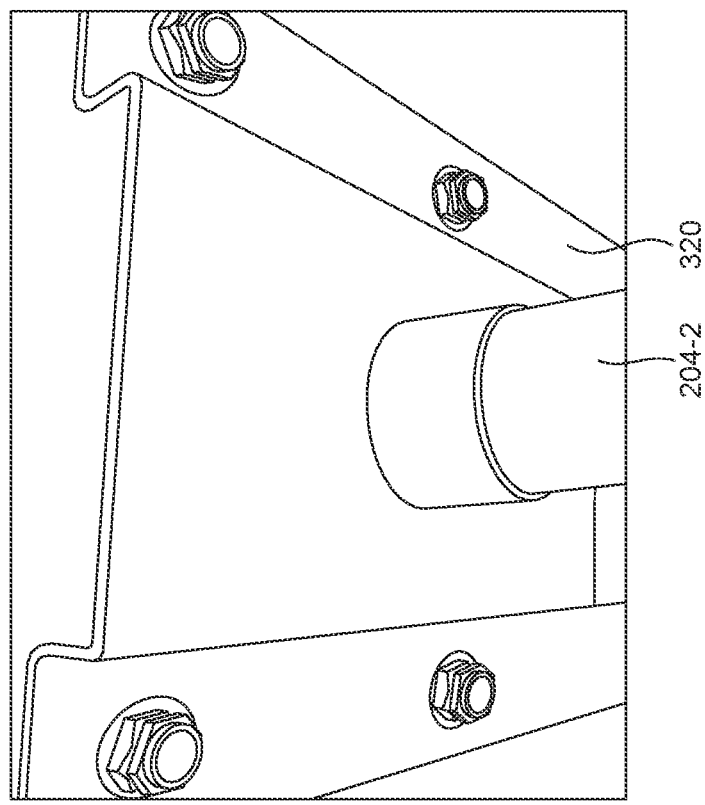

FIG. 3D is a schematic diagram of an inside view of the windshield monitor bracket 206-2, which includes a ceiling flat panel mount 320. The ceiling flat panel mount 320 is configured to be fastened to the windshield monitor bracket 206-2 via the screw apertures. The arm 204-2 is configured to fasten to the ceiling flat panel mount 320 via an aperture, as illustrated in FIG. 3D.

Figure 4B:
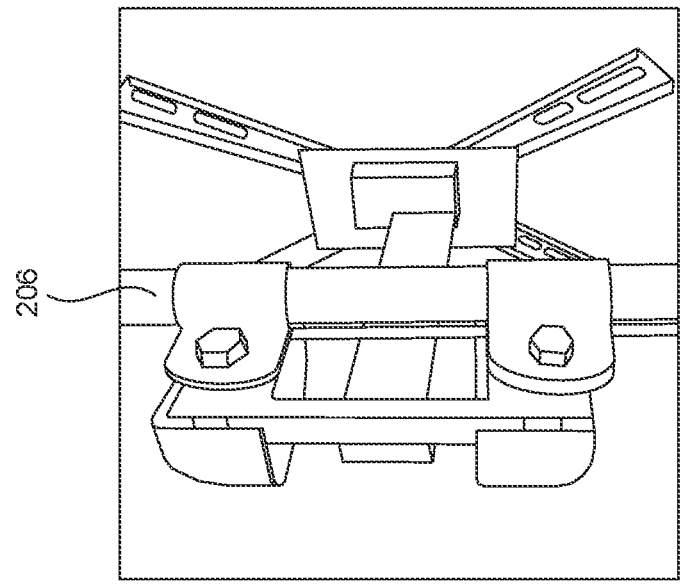
FIG. 4B is a rear view of the mirror bracket that holds the side view monitor of FIG. 4A, according to some embodiments.
Figure 4A:
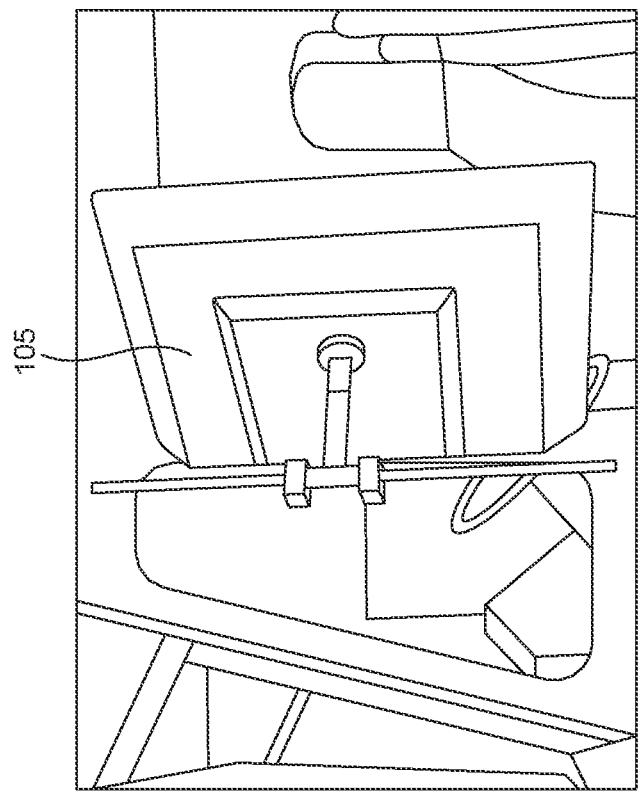
FIG. 4A is a rear view of the side view monitor of the logistics vehicle of FIG. 2A, according to some embodiments.

FIG. 4A is a rear view of the side view monitor 105, according to some embodiments. FIG. 4B is a rear view of the mirror bracket 106 that holds the side view monitor 105, according to some embodiments. In most instances, installment users (also referred to as "designers") should remove the flat and convex mirrors from both mirror brackets. In some instances, the bolts and silver tension brackets can be saved. These existing bolts can be used to attach the side view monitor 105 (e.g., an Amazon 39 inch television mount) to the mirror brackets 106. In some instances, installment users should position the side view monitor 105 in the same locations the mirrors would naturally be. The side view monitor 105 is configured to capture live footage of cars and other objects as the logistics vehicle simulator passes such objects, thereby simulating real side view mirrors. In other words, these side view monitors 105 capture rear facing footage, while the monitors 104 and 106 capture forward facing footage at substantially the same time in such a way that they are synchronized, as described in more detail below.

Described below are examples of how the monitors 104, 106, 105, and 107 can be mounted to the logistics vehicle, as illustrated in FIGS. 2A through 4B via a mounting kit. In some embodiments, the mounting kit includes the windshield monitor brackets 202-1 and 202-2, which can be a part as described in table 1 below:

TABLE 1

| Part # | Vehicle Body Style | Quantity | Part Description |
|---|---|---|---|
| SIM-B1 | Morgan Olsen 2007 Freightliner P700 | 2 | Windshield Monitor Brackets |
| SIM-B2 | Utillimaster 2007 Freightliner P700 | 2 | Windshield Monitor Brackets |
| SIM-B3 | Union City Body (Integrad Locations Only) | 2 | Windshield Monitor Brackets |

In some embodiments, the following components and tools are needed in order to perform the mounting, as illustrated in tables 2 and 3 below:

TABLE 2

| Quantity | Description |
|---|---|
| 1 | SIM-B1-2 Monitor Anti Sway Bracket |
| 2 | SIM-B1-3 Stabilizing Cable |
| 2 | Ceiling Flat Panel Mount for use With 37 in .to 90 in. Flat Panels. |
| 2 | Amazon.com: Amazon Basics Full Motion Articulating TV Wall Mount for 12-39 in. TVs up to 40 pounds: Electronics. |
| 2 | Outwater Plastic H Channel Fits Material ½ in. Thick Black Styrene Divider Moulding 46 In. length. |
| 6 | SIM-B1 MTG Bolts ⅜ Z 1¼ USS GR 5 |
| 12 | SIM-B1 MTG Washers USS Flat Washer ⅜ GR 8 |
| 6 | SIM-B1 MTG Bolts ⅜ × 1¼ USS GR 5 |
| 2 | SIM-B1-2 MTG Bolts ¼ × ½ USS GR 5 |
| 2 | SIM-B1-2 Washers SAE Flat Washer ¼ |
| 1 | SIM-B1-3 MTG Bolt ¼ × 1 USS GR 5 |
| 1 | SIM-B1-3 SAE Flat Washer ¼ |
| 1 | SIM-B1-3 Hex Washer Head Self-Drilling Tek Screw, #14 × ¾ in. |
| 1 | SIM-B1-4 Computer Mounting Plate 3/16 × 33⅞ × 30 aluminum |

TABLE 3

| Required Tools |
|---|
| Safety Glasses |
| Cordless Drill & ⅜ in. Drill Bit |
| Box Knife |
| Marker/Pencil |
| ⅜ in. Drive Ratchet & Socket Set |
| Ladder |
| Shop Vac |

In order to install or mount the monitors 104, 106, 105, and 107, designers may have to take various manual steps, such as remove the windshields and windshield wipers, remove the flat and convex mirrors from mirror brackets, but save the bolts and silver tension brackets to put in the monitors 104, 106, 105, and 107, use the existing bolts to attach the mount (e.g., an AMAZON 12-39 inch television mount) to the mirror brackets (e.g., as illustrated with respect to FIGS. 4A and 4B), and position the monitors 104, 106, 105, and 107 in the same locations that the mirrors or windshield would naturally be.

In some instances, designers may cut a piece of cardboard to the size of each windshield monitor bracket (e.g., 202-1) and use the holes to diagram the hole positions for each bracket where the fastening mechanism, such as bolt is configured to be placed. In some embodiments, brackets are placed where the center of the monitors 104, 106, 105, and/or 107 will be mounted. In some instances, for the most accurate placement, designers may measure the top of the monitor width and center the brackets half of that distance from the center of the logistics vehicle on either side. For example, if a television is 57.2 inches wide, the brackets should be placed 28.6 inches from the center of the vehicle on each side. Next, designers may use the card board cutout to drill, for example, ⅜ inch holes to fit, for example, the (6) ⅜ inch×¼ inch bolts. In some instances, designers may place a ⅜ inch washer on both inside and outside of the bolts. In some instances, designers may use ⅜ inch Nyloc nuts to mount the windshield monitor brackets. In some instances, designers may assemble the "ceiling flat panel mount" (in table 2) kits according to the manufacturer's instructions. In some instances, designers may then install the ceiling flat panel mount into each windshield monitor bracket, as illustrated with respect to FIG. 3D. The ceiling mounts will fit into the windshield monitor bracket holes in these instances. The slotted holes are to help create space to mount the monitors while still allowing designers to slide the monitors closer to the windshield after they are installed. In some instances, designers may then install a "plastic H-channel" component (see table 2) between the monitors 104 and 106 to prevent them from hitting each other, as illustrated in FIG. 2E.

In some instances, designers may then install an "anti-sway bracket" (see table 2) (e.g., the anti-sway bracket 208) to the back of the "ceiling flat panel mount" (see table 2) using, for example, (s) ¼×½ inch bolts with a ¼ inch washer on each bolt, as illustrated in FIG. 2A. In some instances, designers may then connect a "stabilizing cable" (see table 2) from the bottom of the "ceiling flat panel mount" (see table 2) to the firewall of the vehicle to draw the monitors 104 and 106 closer to the vehicle frame 254 or windshield frames 250 and 252 (which couples them together). In some instances, designers can use the ¼ inch×1 inch bolts with a ¼ inch washer on each bolt in the ceiling mount and the #14×¼ "hex-head head self-drilling TEX screw" (see table 2) in the firewall.

In some instances, designers can then install the "computer mounting plate" (see table 2) on the frame rails of the logistics vehicle in the engine compartment 260. A computing device, such as the analysis computing entity 05, is configured to be place on top of and abut against the computer mounting plate.

Figure 5:
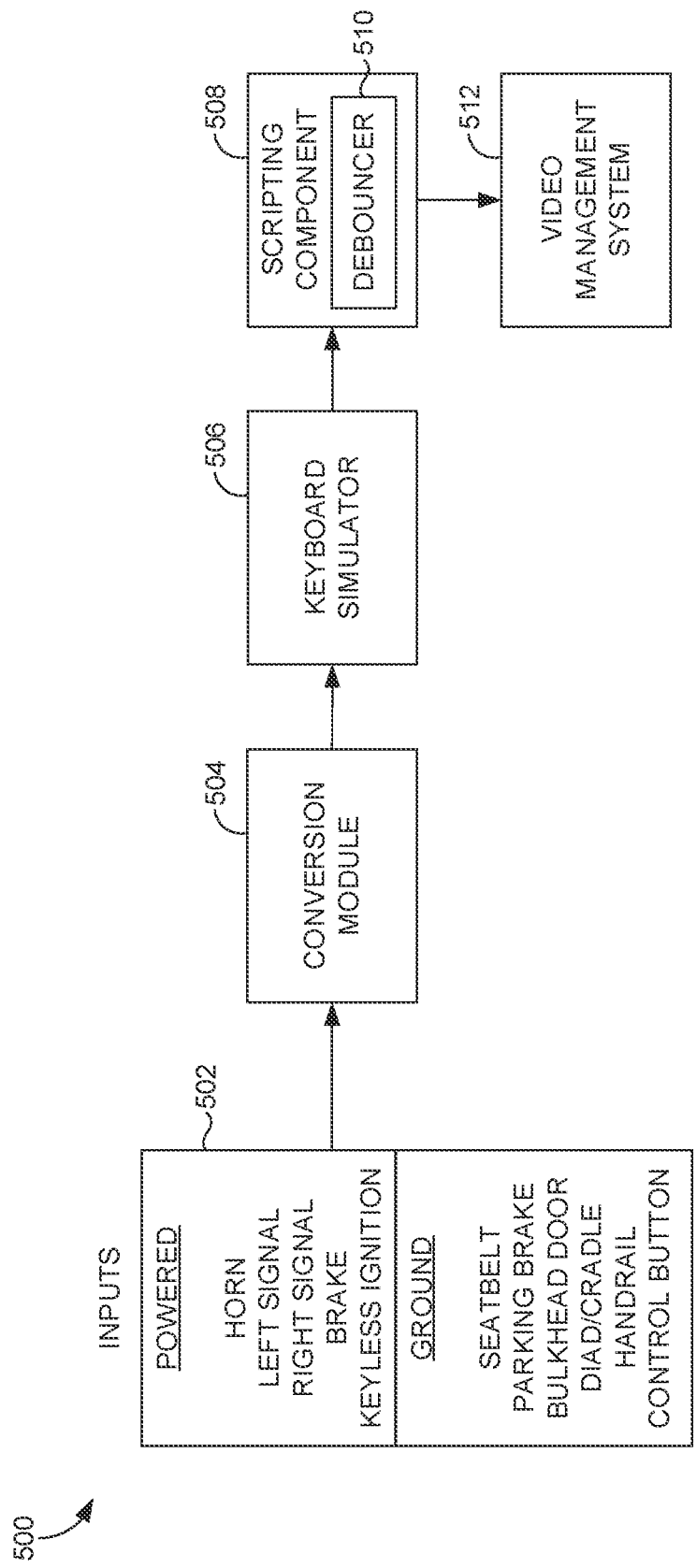
FIG. 5 is a schematic diagram of a harness that controls simulation, according to some embodiments.

FIG. 5 is a schematic diagram of a harness (e.g., a circuit) 500 that controls simulation, according to some embodiments. There are multiple user inputs 502, which are powered, including a horn (e.g., the horn 134 of FIG. 1B), a left signal (e.g., activated via the turn signal lever 120 of FIG. 1B), a right signal (e.g., activated via the turn signal lever 120 of FIG. 1B), a brake pedal (e.g., activated via the brake pedal 122 of FIG. 1B), and keyless ignition inputs (e.g., activated via the key fob button 136-1 or the engine start button 126 of FIG. 1B). "Powered inputs" means that these components are by default configured to power or perform some function at a logistics vehicle. For example, a horn is typically only configured to emit an auditory noise, a left turn signal is typically only configured to cause a blinking at a dashboard display, and a brake pedal is only configured to manually cause a stoppage of a logistics vehicle by causing an application of frictional force to breaks to slow the radial rotation of corresponding tires. As such, with respect to some embodiments of the logistics driving simulator 100, these common powered functions are replaced (and/or supplemented) with additional logic as described with respect to FIGS. 1A through 1C via the conversion module 504 such that the powered inputs are converted into a ground signal instead of the real world powered output (e.g., causing a vehicle to stop). In some embodiments, such conversion occurs via any suitable conversion component, which may be a relay, fet, and/or diode, for example.

Continuing with FIG. 5, the "ground inputs" of the inputs 502 may be or include seatbelt (e.g., the seatbelt 110 of FIG. 1A), parking brake compressed/not compressed (e.g., as described with respect to the brake 122 of FIG. 1B), bulkhead door open/closed (e.g., as described with respect to the bulkhead door 108 of FIG. 1C), whether a DIAD (e.g., the DIAD 116) is in its cradle (e.g., the cradle 118), whether a handrail (e.g., the handrail 114 of FIG. 1A) has been clasped, and/or whether a control button (e.g., the control button 130 of FIG. 1B) has been depressed. In some embodiments, such "ground inputs" are inputs that are already grounded such that the do not need to be grounded via the conversion module 504. However, even the ground inputs may still need to be protected from voltage. All of the user inputs signals are typically "hot" or carry a threshold amount of voltage such that if they are not bridled, they have the potential to overheat or cook the keyboard emulator 506. Accordingly, in some embodiments the conversion module 504 incorporates a diode to protect the keyboard emulator 506. from being damaged due to high voltage. The conversion module 504 is thus generally responsible for either converting the powered inputs to ground signals or using a diode, fet+diode, or similar component to protect the ground inputs from voltage making it to the keyboard emulator 506.

The keyboard emulator 506 is generally responsible receiving, as input, the grounded signals from the conversion module 504 and mapping the signals to key stroke outputs and sending the key stroke outputs to the scripting component 508. The keyboard emulator 506 is a hardware device (and/or a software component) that is plugged into a keyboard port of a computing device in order to emulate the presence of a connected keyboard. Accordingly, for every user input received, the keyboard emulator 506 can activate a certain key (simulating a key stroke) of a keyboard and send the corresponding signals to the scripting component 508. For example, in response to receiving a horn user input, the keyboard emulator 506 can cause activation of the "P" key on a keyboard. The scripting component 508 may then use a data structure, such as a lookup table, may map the P key to some desired output, such as an auditory sound of a horn and/or indicia (e.g., "pressed horn too late") on a display of the monitor 104. Accordingly, the scripting component 508 can responsively instruct the video management system 512 the particular needed visual or audio output based on the key stroke. In some embodiments, the keyboard emulator 506 can be an ARDUINO keyboard emulator, an IPAC keyboard emulator, a MAKEY MAKEY keyboard emulator, and/or any suitable keyboard emulator.

Keyboard emulators typically include programmable inputs. In some embodiments, a GIPO interface will additionally work for receiving user inputs from the logistics vehicle simulator 100 and translating them to usable I/O for the computing device (e.g., the analysis computing entity 105 or the scripting device of FIG. 4). In some embodiments, the keyboard emulator 506 is plugged into the computing device using a standard USB cable and will interface with the logistics vehicle simulator 100 using the pinouts on the board. In some embodiments, connections to the board are sautered to header (pin) connectors for a reliable contact. In some embodiments, the keyboard emulator 506 is connected to the PC using a standard USB cable.

The scripting component 508 (e.g., the analysis computing entity 05) is generally responsible for listening to keyboard emulator outputs (e.g., the letter "P" has been pushed) and generating machine-readable scripts or instructions to cause the appropriate output to be made. For example, the scripting component 508 can map an indication/signal that the letter "P" has been pushed to a desired output via the data structure, as described above. The scripting component 508 can include event listeners in a scripting language (e.g., Javascript), which is used to capture key strokes from the keyboard emulator 506. Accordingly, when the scripting component 508 hears a signal or particular keystroke, it causes some auditory and/or display function, such as pausing the video, selecting a feature on a menu screen, or the like.

In some embodiments, activities are run from a local HTML5 document, which allows for playing videos, responding to user input, and initiating quizzes or activities, as described in more detail below. In some embodiments, Javascript is used to capture the user's inputs and translated into feedback from the simulator. In some embodiments, the HTML5 document is formatted by CSS and displayed to the user through audio and/or video. Accordingly, in these embodiments, the scripting flow by the scripting component 508 is as follows: user inputs (e.g., horn pushed signal, seatbelt on signal) are received, which are then handled by javascript. Responsively, HTML events are created and then formatted by CSS, which cause one or more processors to execute instructions to the monitors 104, 105, and/or 105 (e.g., a "seatbelt on" message).

The debouncer is 510 generally responsible for ensuring that only a single signal (or a limited threshold quantity of signals) for a given single key stroke (or set of key strokes) will be processed or used to produce a corresponding output. The debouncer 510 thus ensures that the scripting component 508 does not get called to frequently with the same signal (e.g., to keep closing a switch) or even different signals. In some instances, continuous signals are being sent from the conversion module 504 to the keyboard emulator 506 or PC (e.g., the scripting component 508) connected to the keyboard emulator 506. The debouncer 510 thus avoids repeated keystrokes or overloading the processor within the scripting component 508 and/or the keyboard emulator 506). In some embodiments, the debouncer 510 is a separate component that resides between the conversion module 504 and the keyboard emulator 506 so that the processor of the keyboard emulator 506 does not get overloaded.

In an illustrative example of debouncer 510 functionality, a key (e.g., the letter "P") may be continually held down or compressed based on a user keeping the left or right turn signal on without stopping. In this use case, the debouncer 510 may contain logic and rules where the same key signal is turned off after a threshold quantity of time, such as 5 seconds. In another example, the processor may overload when any quantity or type of keystrokes are processed within a specific time frame, such as three seconds. For example, the user may have the turn signal lever displaced, while braking, pushing the horn, and the like. There may be logic and rules that dictate, for example, only a first quantity (e.g., 2) of different types of inputs will be processed in any given time window (e.g., 3 seconds).

The video management system 512 is configured to capture the scrip functions issued via the scripting component 508 and call activities, prompts, or other responses (e.g., auditory) based on user inputs. For example, the video management system 512 can call a function responsible for causing display, at the monitor 104 and/or 106 indicating that the user has pressed a horn (based on the horn input), engaged in a left hand/right hand turn (based on turn signal lever input), pressed a brake, etc. In some embodiments, the video management system 512 alternatively or additionally can cause a video feed of real world events to be split across monitors (e.g., monitor 104, monitor 106, and/or side view monitor 105) in a video wall configuration using a video-wall controller and/or an internal GPU, as described in more detail below.

Figure 6:
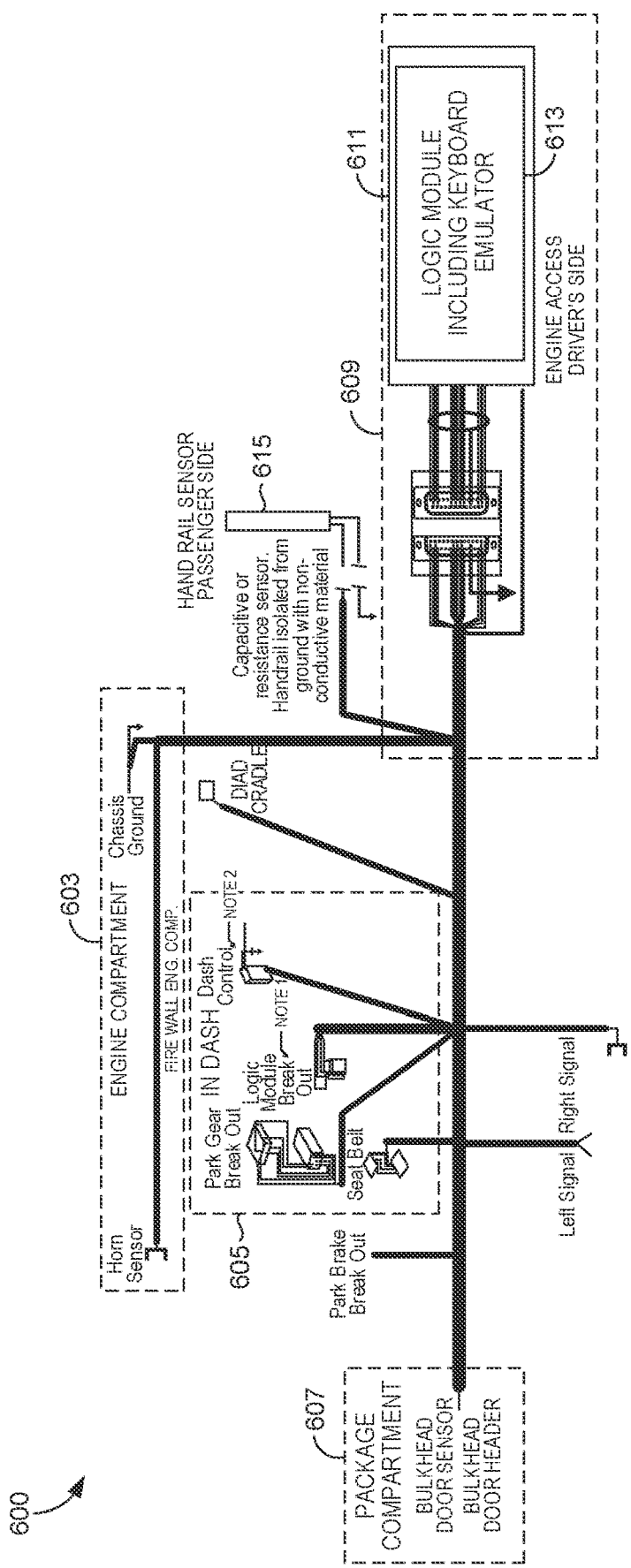
FIG. 6 is a schematic diagram illustrating a spatial location, within the logistics vehicle simulator of FIG. 1A, that the user input components of FIG. 5 are located and termination schematics for each of the user inputs, according to some embodiments.

FIG. 6 is a schematic diagram illustrating a spatial location, within the logistics vehicle simulator 100, the user input components of FIG. 5 are located and termination schematics for each of the user inputs, according to some embodiments. The termination schematics illustrate different transmission line (or bus) configurations for carrying different input/output signals according to various sensors and hardware components, as described in more detail below. In some embodiments, the engine compartment 603 includes a computing device (e.g., the analysis computing entity 05) that includes one or more processors to execute the scripting functions of the scripting component 508 of FIG. 5. The "in dash" 605 may correspond to an interior of the dashboard 138 of FIG. 1B. The dashboard 605 includes a DIAD module for determining whether a contact on the DIAD 116 has engaged a contact of the cradle 118, as described above. The dashboard 138 may further include the conversion (or "logic") module, a park gear breakout (indicates whether the operating driver 102 has engaged a gear (e.g., the interface 139) to park the logistics vehicle), and a seatbelt module responsible for indicating whether the seatbelt 110 has been fastened or not, as described above. The dashboard 605 may further include a keyless ignition module, which is configured to indicate whether a user has selected a button on a key FOB, pushed a button, such as 126, 128, 130, or the like, as described above.

Placement of the computing device in the engine compartment 603 may be desirable because when components (e.g., seatbelt, DIAD cradle, horn, etc.) of the logistics vehicle are functioning, it creates an electromagnetic field, which can interfere with circuit board signals and components. Accordingly, the computing device may be placed in an engine compartment, which may be a sufficient distance away from these interior cab components such that the electromagnetic field has little to no effect on the computing device.

As described herein, the termination configuration may extend through a package compartment 606 (e.g., in the bed of a logistics vehicle) as illustrated by the package compartment component 606 in order to detect whether a user has selected the appropriate package for delivery (e.g., via RFID on the packages, object detection, scanning, via the DIAD 116 of the package, etc.). The engine access driver's side 609 includes the conversion module 611 and the keyboard emulator 613. The termination schematic diagram also illustrates a left/right signal module, which indicates whether the user has pulled the turn signal lever left or right. The termination schematic diagram also illustrates a hand rail sensor module 615 to detect whether a user has touched the handrail 114 of FIG. 1A, as described herein.

In some embodiments, each user input signal (e.g., a signal indicating a seatbelt was fastened) originates from a corresponding hardware component (e.g., the seatbelt 100) within the logistics vehicle simulator 100. For example, the ground signal that the seatbelt 110 sends when it is unbuckled can be tied into using the plug that extends to the dashboard indicator—a pig tail with the same termination can be used to maintain the logistics vehicle's normal operation. An example of a powered input would be using a t-splice to wire into the turn signal indicator without interrupting the signal travelling to the lights themselves. In some embodiments, the handrail 114 is a reliable input based on the user's touch without changing the experience or creating a slip/fall hazard. In some embodiments, this is accomplished using conductive material, such as two strips of copper tape or copper wire that allows the user hand to bridge the wires and complete the ground. Some embodiments use resistance sensors to apply to the handrail 114 that will sense pressure when touched. In some embodiments, a momentary switch, known as the "control button" is installed in the dashboard, which allows the user to exit an activity and navigate freely to the next activity. In some embodiments, the DIAD cradle 118 includes a sensor that shows a ground signal when the DIAD 116 is in the cradle 118 or a momentary switch that compresses when the DIAD 116 is in the cradle 118.

In some embodiments, the following table illustrates example terminations or sensors that are used by the hardware components illustrated in FIGS. 1A through 1C:

| User input components | Terminations |
| --- | --- |
| Seatbelt 110 | Vehicle manufacturer's termination |
| Parking brake | Vehicle manufacturer's termination |
| Bulkhead door 108 | Existing telematics sensor or momentary switch |
| DIAD cradle 118 | Device manufacturer pin that shows ground on 9 pin connector or custom installed momentary switch |
| Handrail 114 | Motion-sensor, touch sensor, or wires that can conduct a ground signal when touched |
| Horn | Vehicle manufacturer's termination |
| Left signal | t-splice or momentary switch |
| Right signal | t-splice or momentary switch |
| Brake pedal | Vehicle manufacturer's termination |
| Keyless ignition, key FOB ("on" button, "off" button, ignition on) | Vehicle manufacturer's termination. |

Figure 7A:
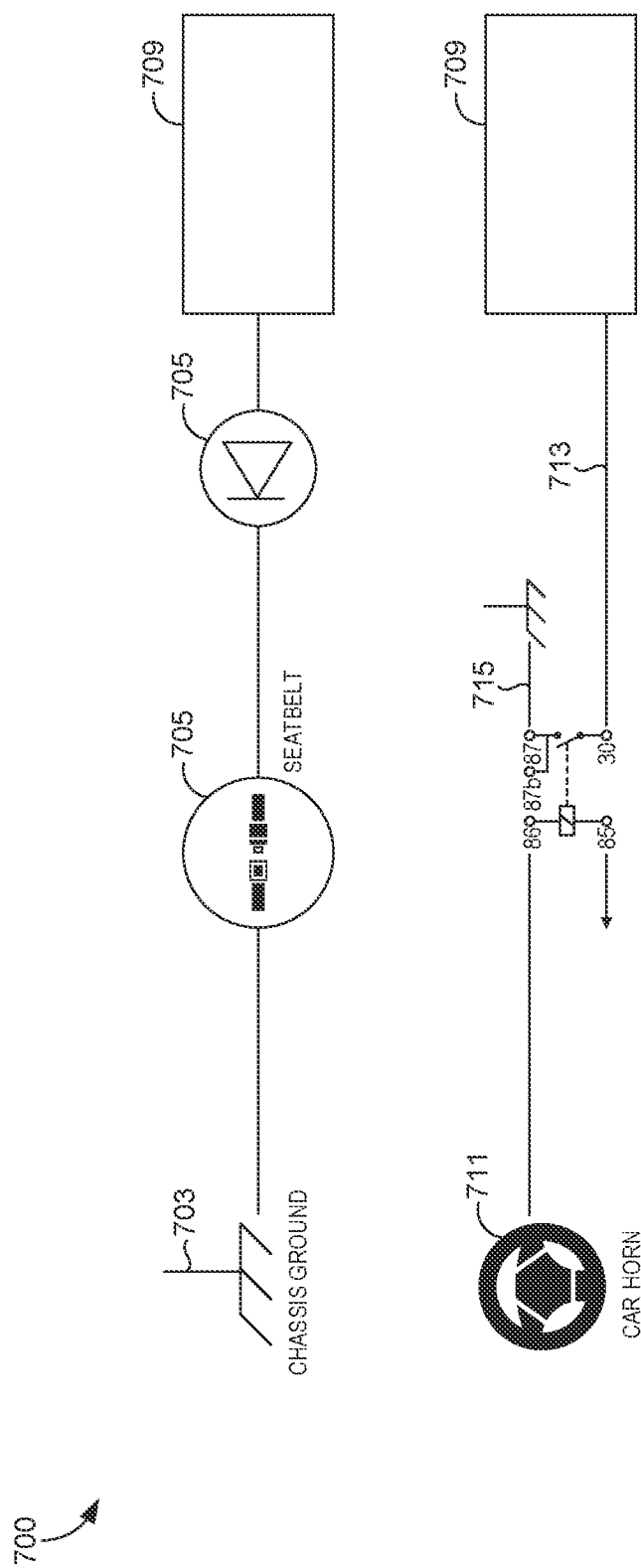
FIG. 7A is a schematic diagram illustrating how a conversion module performs its functionality with respect to certain components, according to some embodiments.

FIG. 7A is a schematic diagram illustrating how a conversion module (e.g., the conversion module 504 of FIG. 5) performs its functionality with respect to certain components, according to some embodiments. In various embodiments, a keyboard emulator 709 is looking for a ground signal from each of its input pins associated with the seatbelt 705 and the car horn 711. In some embodiments, when one of the inputs encounter ground signal, the keyboard emulator 709 sends a key-down signal (arrow down), illustrated by 713. As the ground signal continues, in some embodiments it sends a key-press signal. In some embodiments, then the ground signal is lost, it sends a key-up (up arrow) signal, as illustrated by 715. In some embodiments, if at any time the keyboard emulator 709 experiences voltage it will destroy or overhead the keyboard emulator 709. This means that all signals, including the hot signals are converted to a ground-completion signal, in some embodiments. For example, with respect to a seatbelt 705 (e.g., the seatbelt 110 of FIG. 1), in some embodiments for ground inputs a diode 707 is added to prevent accidental voltage reaching the keyboard emulator 709. In some embodiments, for powered inputs, a relay is used to protect the keyboard emulator 709 from voltage.

Figure 7B:
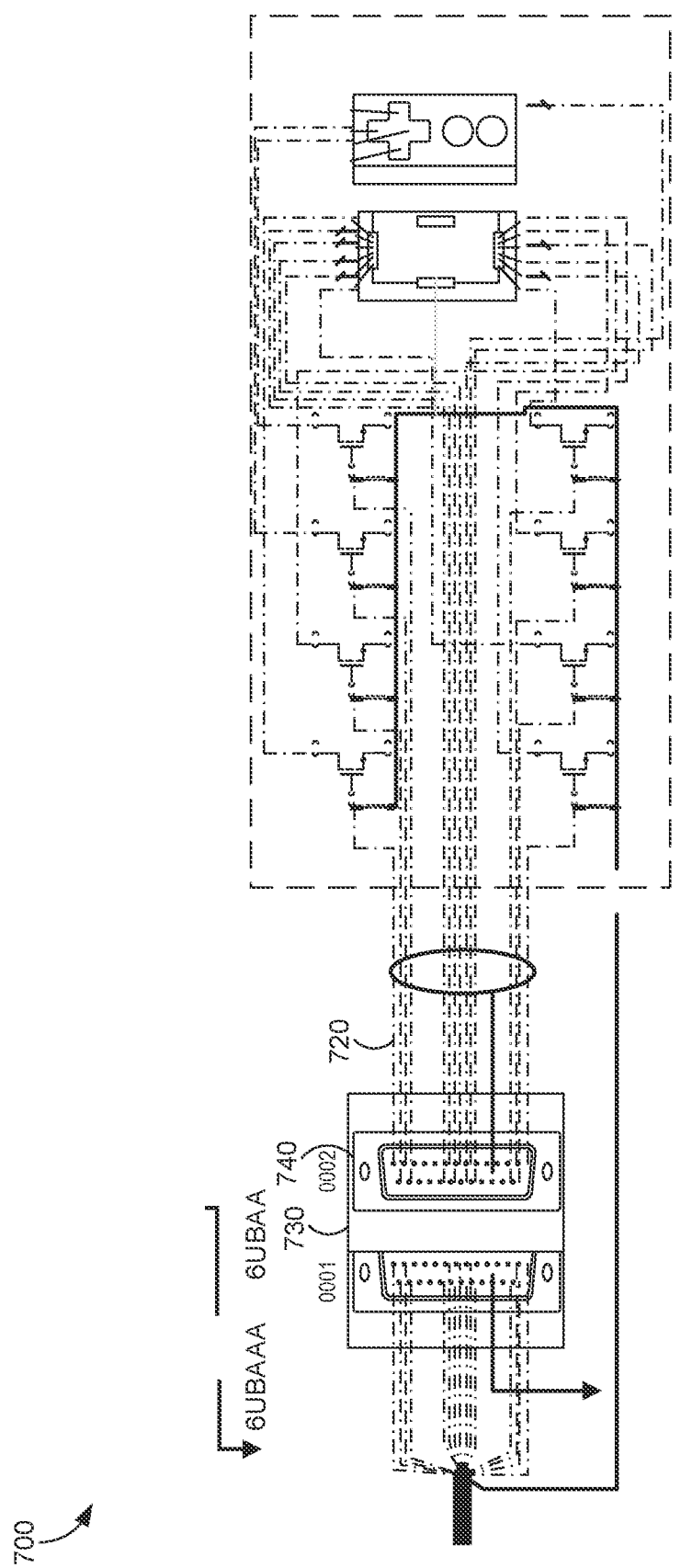
FIG. 7B is a schematic diagram illustrating how a conversion module performs its functionality, according to some embodiments.

FIG. 7B is a schematic diagram illustrating how a conversion module (e.g., the conversion module of FIG. 5) performs its functionality, according to some embodiments. As illustrated in FIG. 7B, the horn, foot brake, the left signal, right signal, the keyless inputs (e.g., keyless flash, keyless start, keyless stop, keyless run) and the like are all connected to specific communication lines 720 or buses with specific terminations (e.g., "free switch"), which are also connected to specific keyboard emulator key inputs 740 at the keyboard emulator 730. In this way, for every user engagement detected at a specific vehicle input (e.g., horn, brake, seatbelt, etc.), a corresponding key is input at the keyboard emulator 730, which then causes one or more instructions to be generated, such as an auditory horn sound, a "brake on" message displayed, and the like.

Figure 8:
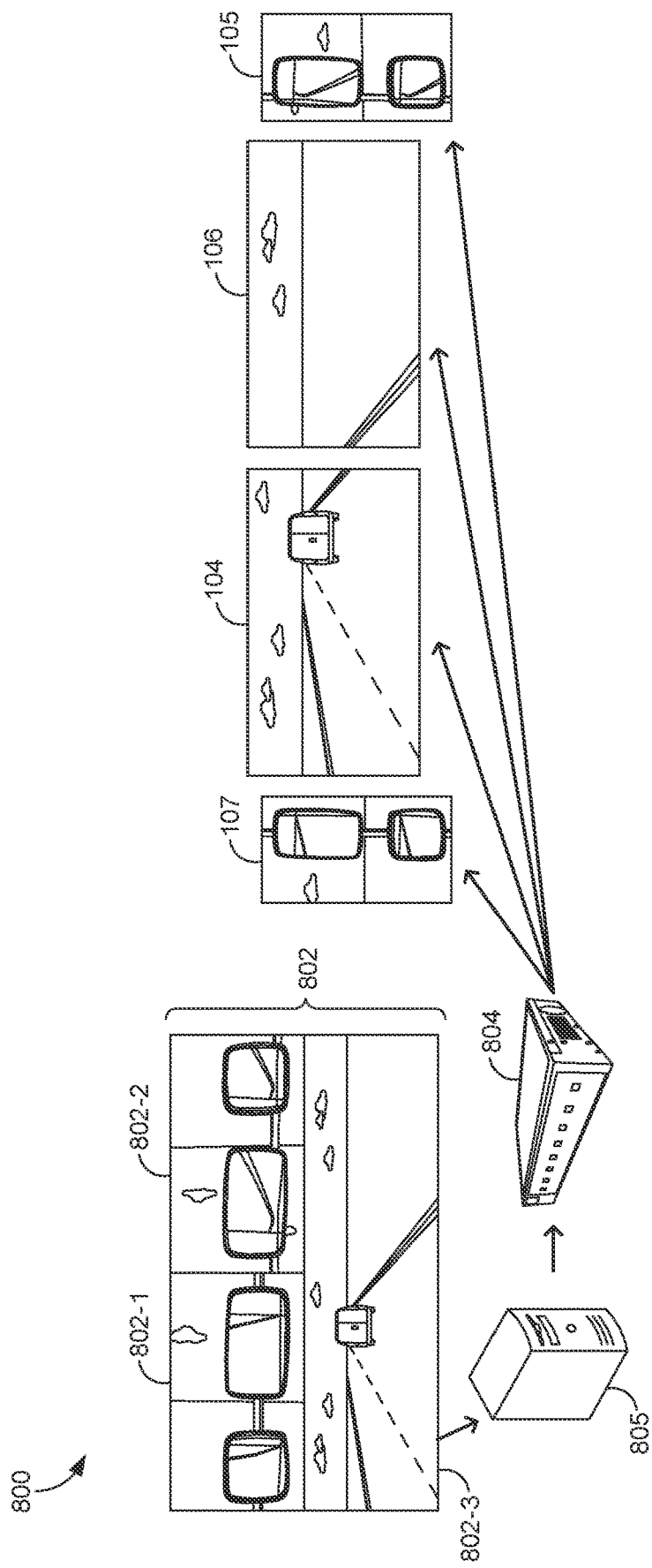
FIG. 8 is a schematic diagram illustrating how video is played to the monitors of FIG. 1A, according to some embodiments.

FIG. 8 is a schematic diagram illustrating how video is played to the monitors 104, 105, 106, and 107, according to some embodiments. In some embodiments, the footage is real-world footage of scenery (e.g., real street signs, roads, pedestrians, trees, etc.) that is captured by cameras of a vehicle prior to the functioning of the logistics vehicle simulator 100. In other embodiments, the footage represents near real-time footage. In some embodiments, the footage that is played in the logistics vehicle simulator 100 displays both forward-facing and rear-facing footage in sync so that logistics personnel training can be done with proper use of vehicle mirrors. To accomplish this, particular embodiments capture video simultaneously with three cameras. A first camera is faces forward or faces in a plane parallel to the length of a vehicle or street so as to captures scenery in front of a vehicle. A second camera faces backward in the same plane except that it captures scenery behind the vehicle on a passenger side of the vehicle, representing side view monitor 105. A third camera also faces backward in the same plan except that it captures scenery behind the vehicle on a driver side of the vehicle, representing the side view monitor 107.

Subsequent to the capturing of the footage, the footage is edited in one high quality video wall 802, via the computing device 805 (e.g., the analysis computing entity 05) with the feeds 802-1 and 802-2 to be displayed to the side view monitors 105 and 107 positioned on the top half of the screen and the forward facing footage 802-3 positioned across the bottom half. In some embodiments, the video at the video wall 802 is iteratively edited in order to synchronize forward facing monitors (104 and 106) and rear facing monitors (105 and 107) such that a first real world scene, for example, is first displayed at the monitor 104 to capture a frontal view of the first scene and then the same first real world scene is subsequently displayed at the monitor 107 to capture a side or rear view of the same first scent after some predetermined threshold based on the editing (e.g., 0.5 seconds, 1 second, etc.). In some embodiments, a video wall controller 804 (or any other suitable splitter) is then used to split the video wall 802 across the monitors 107, 107, 106, and 105, as illustrated in FIG. 8. In some embodiments, the software to display the HTML5 video displays full screen without any visible controls for an immersive experience.

Figure 9A:
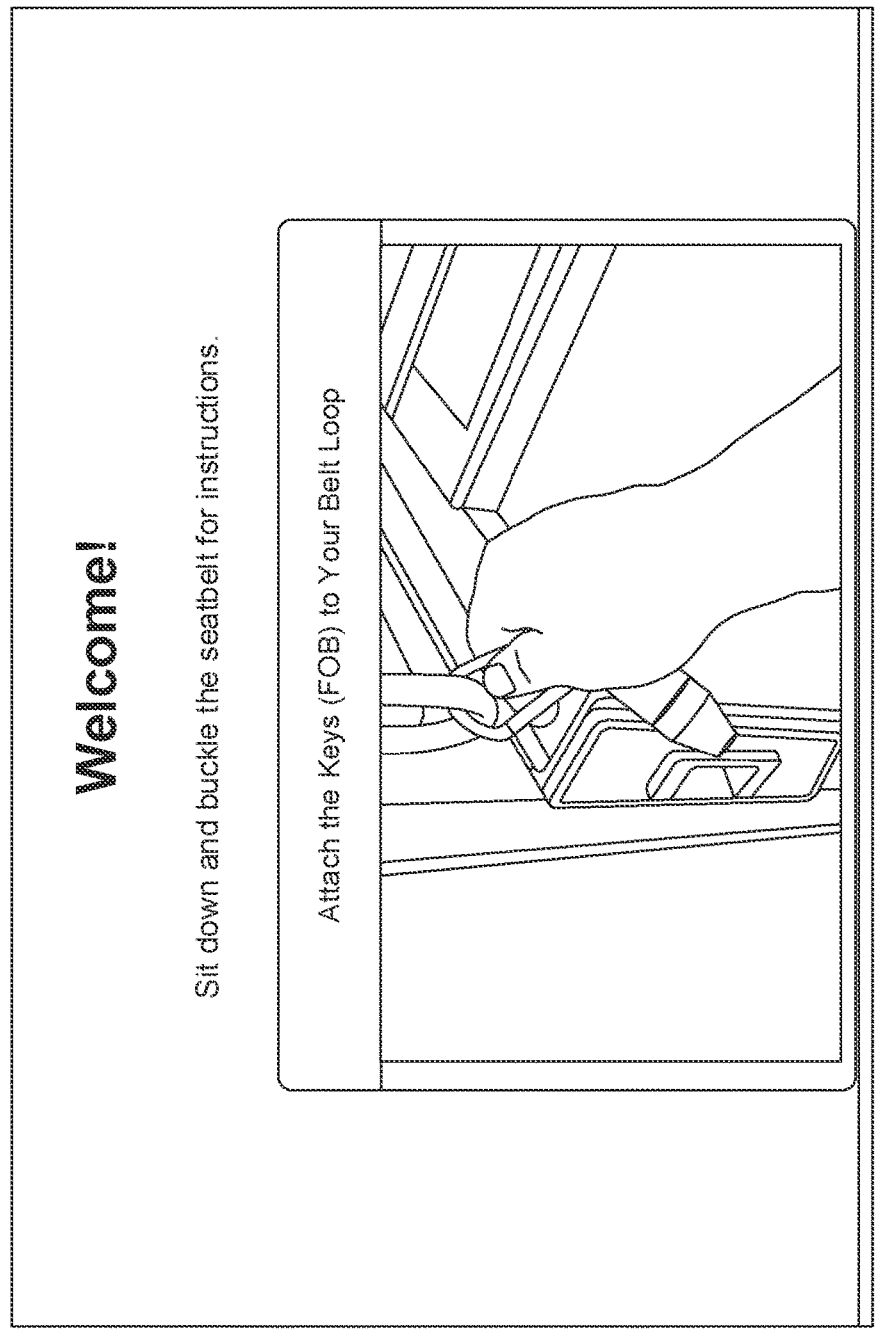

FIG. 9A is an introduction screenshot 900 of a training module used to train a package delivery driver, according to tome embodiments. In some embodiments, each screenshot of FIG. 9 (9A through 9j) is caused to be displayed to the monitors 104, 105, 106, and/or 107 in order to train the driving operator 102 via the logistics vehicle simulator 100.

In some embodiments, when entering the logistics vehicle simulator 100, the vehicle operator 102 is prompted, via the introduction screenshot 900 and/or auditory input to "put your DIAD (e.g., DIAD 116) into the DIAD cradle (e.g., DIAD cradle 118), sit in the seat and buckle your seatbelt (e.g., seatbelt 110)" and/or to attach the key fob (e.g., key fob 136) to their belt loop. In response to detecting that the seatbelt 110 has been fastened, particular embodiments cause the screenshot 900 and/or auditory instructions that the vehicle operator 100 needs to start the vehicle (e.g., via the engine start button 126). Some embodiments provide additional instructions to practice slowly and carefully at first until operators can start the car smoothly. In some embodiments, in response to detecting that the driving operator 102 unbuckles the seat belt 110 (e.g., detecting that there is no longer any contact between the first and second contacts at the male and female ends), particular embodiments cause display of the star car screenshot 902 of FIG. 9B.

Figure 9B:
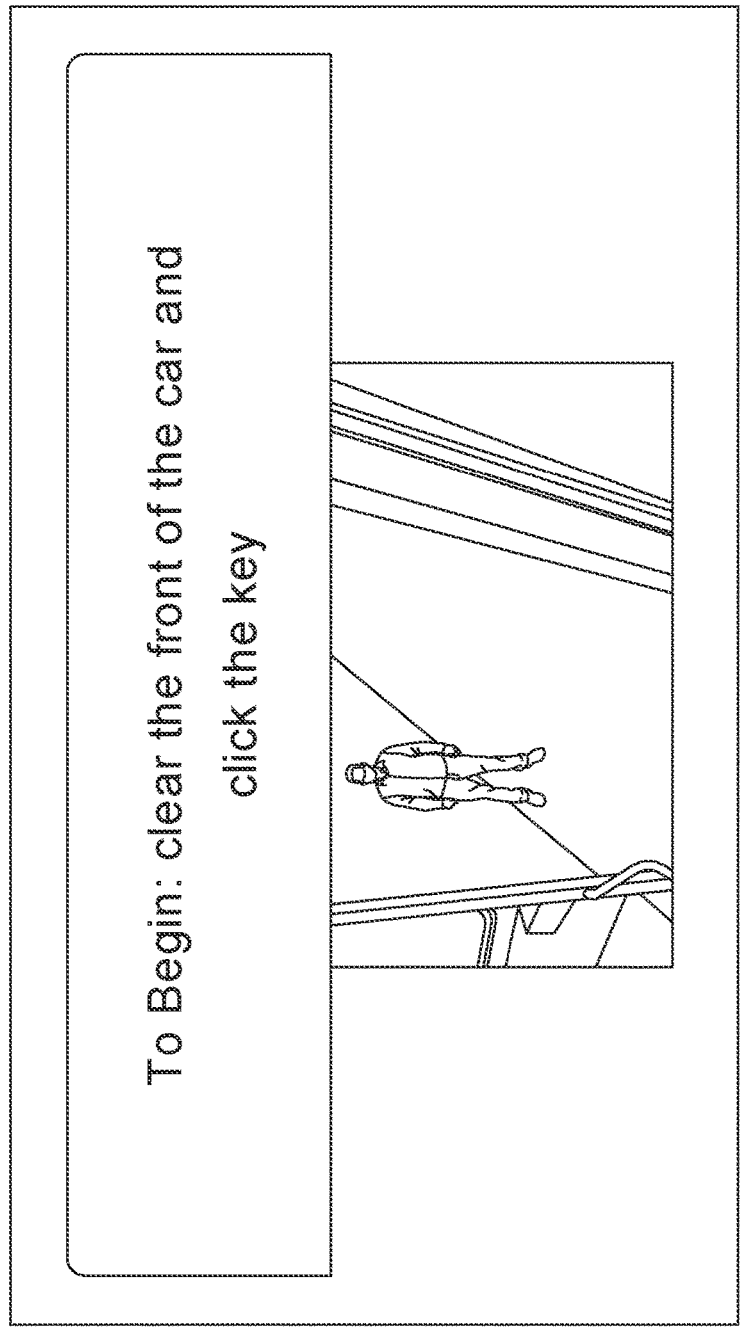

FIG. 9B is a screenshot 902 that illustrates what activities the user needs to do before and/or during the start of the logistics vehicle simulator 100, according to some embodiments. Specifically, the start car activity walks the user through the steps to start the logistics vehicle responsively one step at a time, which may begin with a prompt (screenshot 902) for the user to clear the front of the car and click a button on the key FOB. In some embodiments, to clear the front of the car means to walk past the front of the car and/or look under and/or around the logistics vehicle simulator 100 to check for any potential hazards, such as small children or animals. Some embodiments use object detection cameras, as described herein, to detect whether a user performs this activity.

Figure 9C:
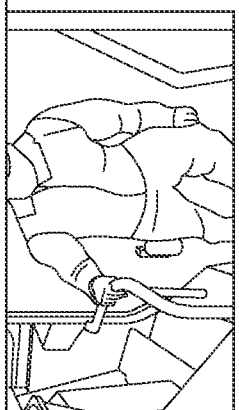
Figure 9D:
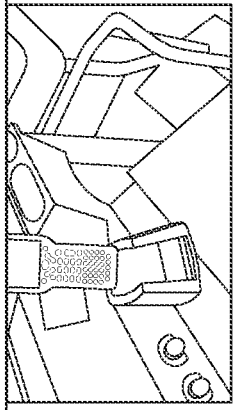
Figure 9E:
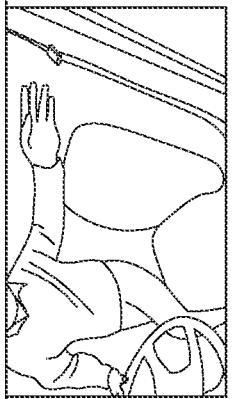
Figure 9F:
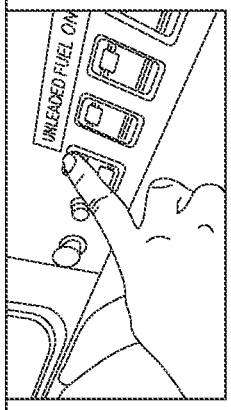

In some embodiments, in response to the user successfully pressing a button (e.g., the button 136-1) on the key fob and/or clearing the front of the car, particular embodiments cause display of the screenshot 904 of FIG. 9C to prompt them to use the handrail, cause display of the screenshot 906 of FIG. 9D to prompt them to put their DIAD in the cradle, cause display of the screenshot 908 of FIG. 9E to prompt them to buckle the seatbelt, and/or cause display of the screenshot 910 of FIG. 9F to press the green button two times (which may be indicative of starting the car via the engine start button 126). Some embodiments additionally prompt users to overturn a key in a key ignition receptacle to star the logistics vehicle 100. In some embodiments, each of these activities is done in succession based on prior activities being completed. For example, in response to detecting that a user has clasped the handrail 114, particular embodiments cause display of the screenshot 906 (i.e., the handrail 114 must be clasped before a DIAD is placed in its cradle). In response to receiving an indication that the user has placed the DIAD 116 in its cradle 118, particular embodiments cause display of the screenshot 908 (i.e., DIAD must be placed in the cradle before a seatbelt is fastened). And in response to detecting that the user has fastened the seatbelt 110, particular embodiments cause display of the screenshot 910 to prompt the user to press the green button twice. In some embodiments, none of these prompts are displayed and the functionality will not continue unless the user engages in the required task preceding the prompt.

In some embodiments, these activities are detected, as described above with respect to FIGS. 1A through 1C and FIG. 4. For example, in response to receiving an indication that the first and second contacts of the DIAD 116 and DIAD cradle 118 meet to close a switch, particular embodiments determine that the DIAD 116 has been placed into the cradle 118. Likewise, in response to receiving an indication that the touch sensor of the handrail 114 has been touched, particular embodiments determine that the user has used the handrail 114, and the like.

In some embodiments, the key fob only stays active for 8 second after it is pressed so it may be imperative that the driving operator 102 start the logistics vehicle smoothly and move out without delay. In some embodiments, if it is detected that the driving operator 102 fails to start the logistics vehicle within a predetermined threshold of time (e.g., 60 seconds, two minutes, etc.) from the time that the screenshot 902 is displayed, particular embodiments cause display or cause an auditory signal to be emitted indicating that the user must repeat the activity until they successfully start the car in a timely manner. In response to detecting that these start car activities have been successfully completed with a threshold time period, particular embodiments cause display of the main menu screen 912 of FIG. 9G.

Figure 9G:
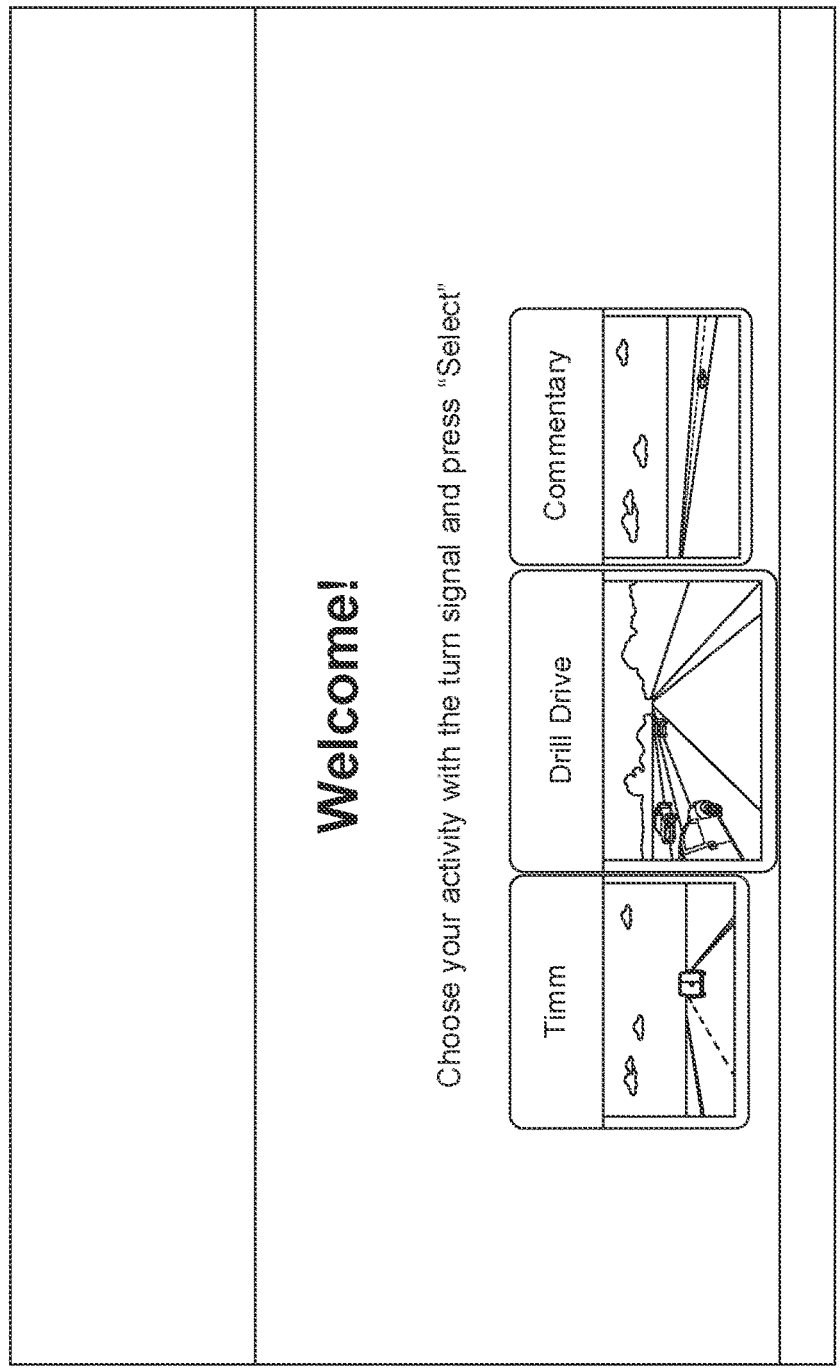
Figure 9H:
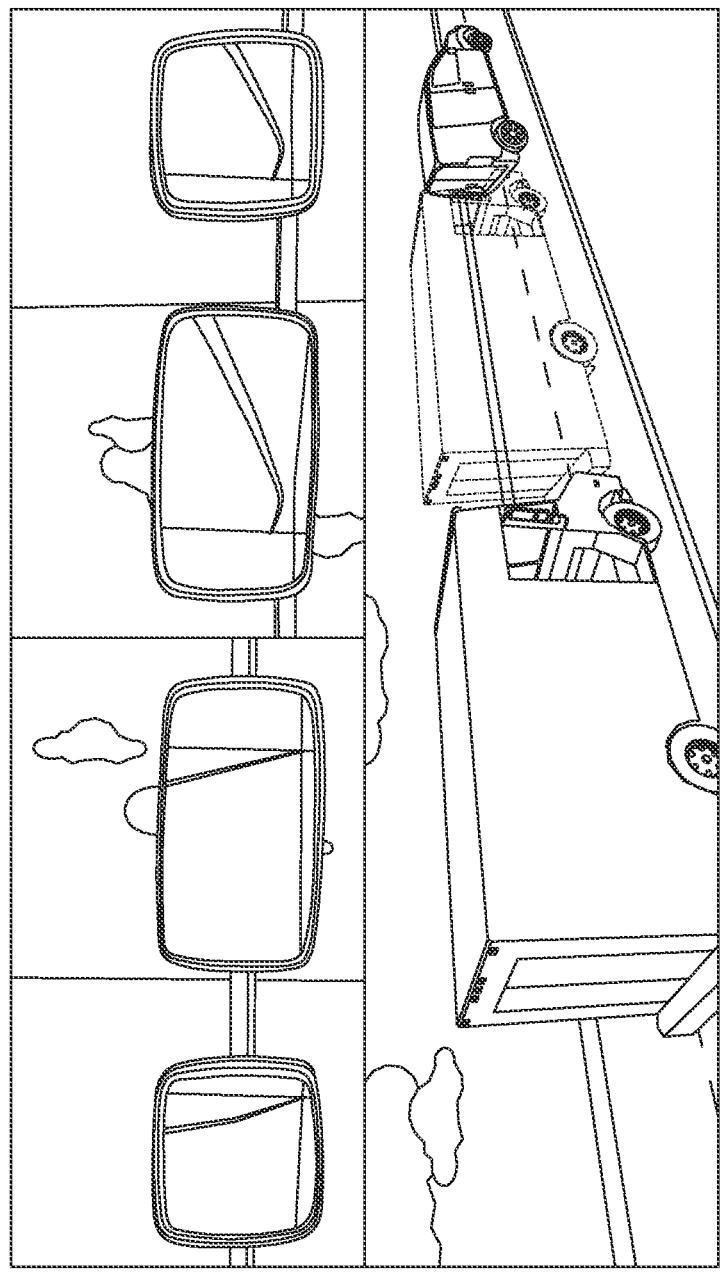
Figure 9J:
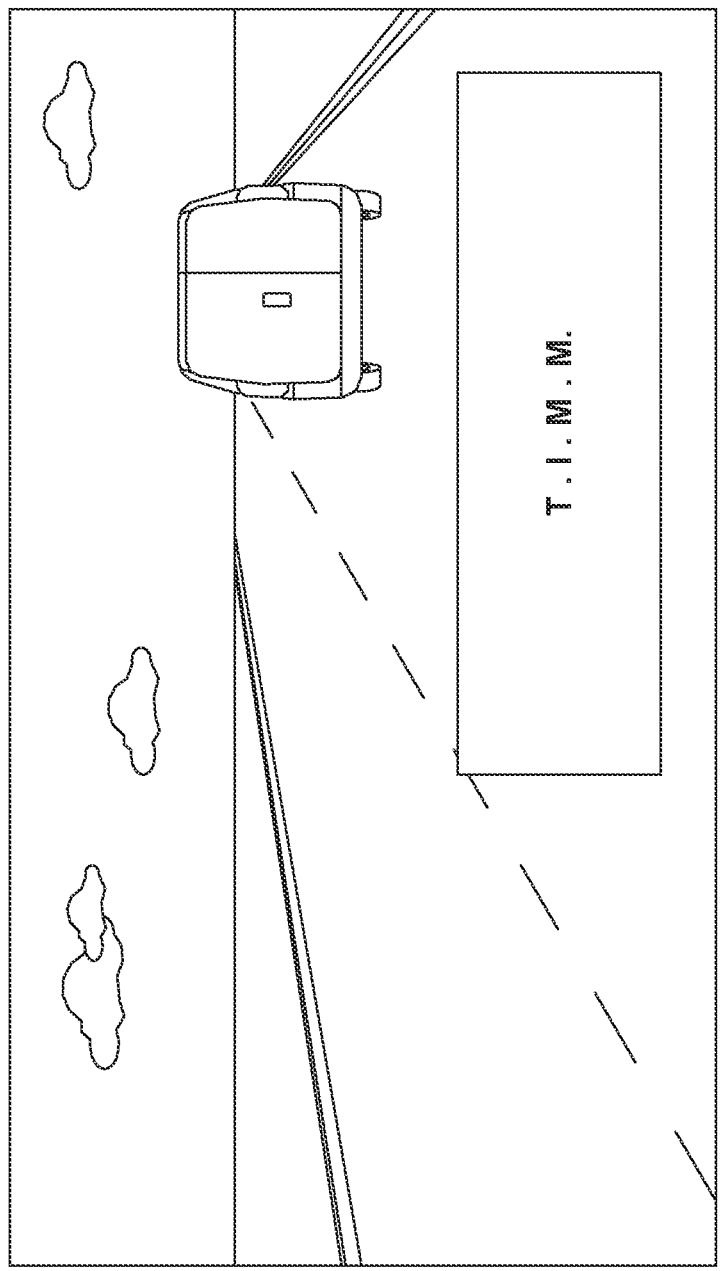

FIG. 9G is a screenshot 912 of an example main menu to engage in one or more defensive driving activities, according to some embodiments. The defensive driving activities in the main menu include TIMM, drill drive, and driver commentary, as illustrated in the screenshot 912. These are verbal activities for calling out (e.g., via auditory sound by the driving operator 102 and/or user interface selections) and identifying the proper response hazards in the driving scene, which may be used by supervisors during training rides to evaluate how well a driver can call out and respond to their driving scene displayed to the monitors 104, 106, 105, and/or 107. The training in the logistics vehicle simulator 100 is designed to prepare driver candidates for those training rides.

In some embodiments, in order to select an activity, the turn signal lever (e.g., 120) is used to navigate left or right in the menu and the installed "select" control button (e.g., control button 130) on the dashboard is used to select the activity. For example, in response to receiving an indication that the driving operator 102 has pushed the turn signal lever down, particular embodiments cause a highlight over the Timm tile at the screenshot 912. Subsequently, in response to receiving an indication that the user has selected the "select" control button, particular embodiments open software workflows or individual training sessions associated with TIMM.

In some embodiments, after selecting an activity or training module, the user is given an "introduction" to the activity. In some embodiments, the user can either watch the introduction video at which point the simulator will advance to the next activity or the user can press the "select" control button on the dash to skip to the next activity.

In some embodiments, each of the three activities (TIMM, Drill Drive, and Commentary) has a structure as follows— an introduction, explanation, quiz, demonstration, and practice sequence. Some embodiments automatically advance through these sequences unless the user skips the activity via the presenting of the "select" button and/or other user input, such as via an auditory command.

In some embodiments, the "introduction" to each activity answers the question "why is this activity important to learn?" For example, the introduction to the activity TIMM's explains that UPS drivers pay attention at intersections and refrain from distracted driving. In order to highlight the importance of these two methods, the user may view, at the monitors 104 and 106, video feed of a group of teenagers getting in an accident at an intersection as a direct result of distracted driving. Some embodiments cause display of a reminder that they are expected to know the contents of this activity by the end of the module. This reinforces that the content is important for their safety and also requirement of their job.

In some embodiments, the "explanation" portion of each of the three activities uses graphical overlays, such as superimposed AR highlights and/or verbal descriptions of each hazard and how such hazards should be handled. For example, with respect to the screenshot 914 of FIG. 9H, the user is told that they are to leave a car length of space when stopped in traffic. To further demonstrate, a logistics vehicle is superimposed over the video scene to show that the expected car length should be the length of the vehicle being driven by an employee. The "explanation" portion is used to describe concepts more thoroughly and slowly to prepare the user for a short quiz. Subsequently, when the user actually engages in defensive driving (i.e., the "practice" component), the video feed may include superimposed AR indicia over pixels representing the pavement or road between the operating user's vehicle and the vehicle directly in front of the operating user's vehicle. Such superimposition indicates the specific distance that the user's vehicle should be behind the other vehicle.

FIG. 9*i* is a screenshot 916 of an example user interface indicating a quiz portion for an activity, according to some embodiments. In some embodiments, each quiz is completed based on detecting that the user has used the turn signal lever to select an answer on the right or on the left. For example, in response to receiving an indication (e.g., a control signal) that the driving operator 102 has pressed down on the lever, particular embodiments cause selection of the "keep your eyes locked" button 950 via the screenshot 916. In response to receiving an indication that the user has pressed up on the lever, particular embodiments cause selection of the "every 2 seconds" button 952. In some embodiments, if the selected answer is correct, particular embodiments cause an auditory "correct" sound utterance to be produced and the quiz workflow proceeds to the next question. In some embodiments, if the answer is incorrect, particular embodiments cause an auditory "incorrect" sound utterance to be produced and are told (via auditory or displayed indicia) what the correct answer is. For example, referring to the screenshot 916 of FIG. 9*i*, the user may have selected the "keep your eyes locked" button 950. Responsively, particular embodiments cause a red highlighting of the button (954) and cause presentation of the "keep your eyes moving" indicia 956, which indicates that the answer was incorrectly answered. In some embodiments, if any questions are answered incorrectly during the quiz, the user is automatically cycled through the quiz again until all of the answers are correct.

It is understood that any user input described in FIGS. 9A through 9*i*, such as with respect to the turning signal lever, control button, or the like, can alternatively or additionally be a touch on a touch screen, where, for example, the monitors 104 through 107 includes user interface buttons configured to receive touch inputs from a user (e.g., such as in a quiz scenario where the user selects an answer).

In some embodiments, the "demonstration" portion of each activity is a verbal (and/or visual) demonstration of what a supervisor would expect to hear if they were riding with the drivers. Some embodiments cause verbal demonstration utterances to be produced to users, which details hazards should be identified and what should be done with the vehicle. In some embodiments graphic overlays are used to help highlight the items being called out. For example, with respect to the screenshot 920 of FIG. 9*j*, on the instructor calls out the "I" on the acronym TIMM. "I" stands for intersection so a graphic on the screen is showing that the intersection is the square between the crosswalks where the vehicles will actually intersect. This is to prepare the user for calling out the hazards themselves.

In some embodiments, the "practice" portion allows the user to interface with the particular driving scene (e.g., using the components of the driving simulator 100) without any distractions to call out hazards and practice in preparation for a ride with a supervisor. Some embodiments prompt and cause display of graphical overlays to make sure that the user understands and/or can remember the activity. For example, while the user training for driving down a road, the video feed may have a highlighted pedestrian who is not walking down a cross walk, which indicates that the user should call out or indicate that the pedestrian is present. In some embodiments, the practice portion continues in a loop until an indication that the user has pressed the "select" control button is received, at which point particular embodiments cause presentation back to the main menu.

In some embodiments, if it is detected that the driving operator 102 has removed the seatbelt 110 (e.g., the first and second contacts are no longer touching), particular embodiments cancel the activity the driving operator 102 is currently engaged in and causes display (and/or verbally instructs) of an indication to the user to prompt the user to shut of the engine on the logistics vehicle (e.g., press the engine stop button 128) and return the keys to their designated location for the next user. Particular embodiments responsively cycle back to the introductory activity (e.g., the screenshot 900 is re-displayed).

As described herein with respect to TIMM, Drill Drive, and Commentary, there may be various defensive driving training modules that a user engages in. The defensive driving techniques may be centered around the concept of "Space and Visibility." This means, space for the vehicle and visibility for the driver. In reference to space, various embodiments instruct drivers about leaving a car length of space when stopped in traffic and the space may be defined by a superimposed AR overlay. Further training instructions can be for operations to Count 1, 2, 3 after that vehicle has begun to move and leaving appropriate following distance when driving down the road. While travelling it is expected that drivers leave 4-6 seconds of following distance when travelling up to 30 mph and 6-8 seconds whenever the driver exceeds 30 mph. Following distance can be easily judged by the driver by picking a stationary item alongside the road like a traffic sign and counting how many seconds it takes to reach that sign after the rear bumper of the car ahead passes it. This is the most accurate way to judge the distance between your vehicle and the car ahead and also gives you the most reliable distance to stop your vehicle. Additionally, some embodiments instruct drivers to keep space on all four sides of the car and that they always have the responsibility to keep space in front of the car. A majority of these rules are discussed and coached in the Commentary portion of the simulator.

In reference to visibility, some embodiments instruct a driver to engage in a "Triangular Method of Viewing." This means that operators should move their eyes to the front of the driving scene every two seconds (e.g., as determined by the eye tracking functionality described herein) identifying priority elements like traffic lights, intersections, motorists, pedestrians, their eye lead time and following distance. Particular embodiments instruct users to check a mirror every 5-8 seconds identifying our traffic condition, lane position and whether we have any mechanical problems with our vehicle, which can be monitored via the eye tracking functionality described herein. Particular embodiments also instruct drivers to never move their eyes mirror to mirror in order to keep their eyes ahead of the vehicle as they drive, which can be monitored via the eye tracking functionality described herein. The Driver Drill portion of the simulator teaches how to move your eyes in this triangular method of viewing while always making any hazard the priority.

TIMM: teaches intersection safety in regard to these principles as well as the importance of attentive driving. Drill Drive: teaches the triangular method of viewing. Commentary teaches about 10 specific situations where our drivers are expected to follow UPS principles of defensive driving (such as a pedestrian along the edge of the road) how to identify those situations and how UPS expects them to behave. (for instance tap the horn and make eye contact). These 10 items are referred to at UPS as the 10 point commentary. Each of the three activities above take the user through an Introduction to the activity, an explanation, a quiz, a demonstration and an opportunity to practice. These activities can all be assessed by an On Road Supervisor either in a live driving scene or using the practice portion of the simulator.

Figure 10:
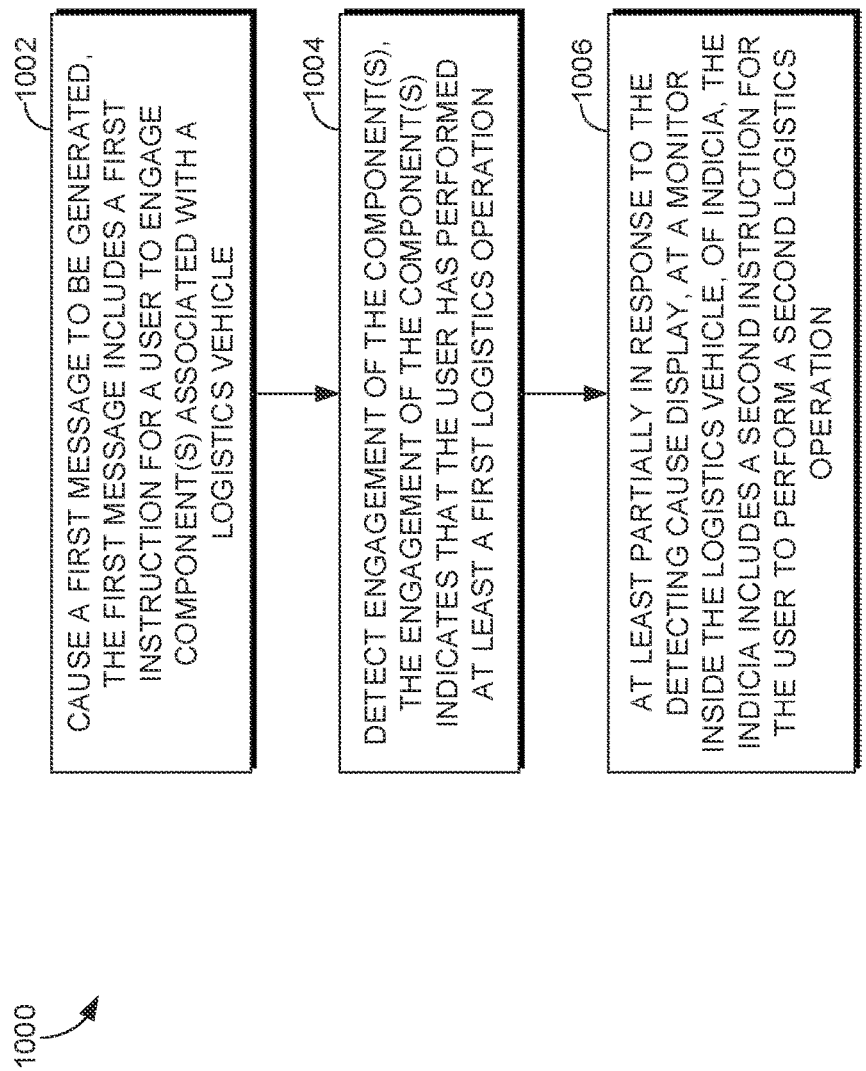
FIG. 10 is a flow diagram of an example process for providing instructions to train a user in one or more logistics operations, according to some embodiments.

FIG. 10 is a flow diagram of an example process 1000 for providing instructions to train a user in one or more logistics operations, according to some embodiments. The process 1000 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1A through FIG. 13). The computer-implemented method, the system (that includes at least one computing device having at least one processor and at least one computer readable storage medium), and/or the computer readable medium as described herein may perform or be caused to perform the process 800 or any other functionality described herein.

Per block 1002, some embodiments cause a first message to be generated, where the first message includes a first instruction for a user to engage one or more components associated with a logistics vehicle (e.g., and where the first instruction is associated with training the user to perform a logistics operation). Examples of this are described with respect to FIG. 9A through 9i. For example, some embodiments can produce an auditory message instructing the user to fasten a seatbelt. Components that are "associated" with the vehicle mean that they are built in to the logistics vehicle, are loosely coupled to the logistics vehicle (e.g., the DIAD 116), and/or produce actions relating to the logistics vehicle even though they may not be coupled to or reside in the logistics vehicle, such as the key fob described herein. Alternatively, some embodiments cause presentation, at the monitor 104, of a visual instruction for the user to place a DIAD in a cradle. The "one or more components" can be any suitable component described with respect to the logistics vehicle simulator 100 of FIG. 1A, such as the handrail 114, the DIAD 116, the DIAD cradle 118, the steering wheel 112, the bulkhead door 108, the seatbelt 100, the brake pedal 122, and/or any of the user input components described with respect to the user inputs of FIG. 5.

A "logistics operation," "task," or "activity" as described herein refers to any physical or logical task that logistics personnel engage in. For example, a logistics operation can be to: clasp a handrail, press a button on a key fob, place a DIAD in its cradle, start up a logistics vehicle, push a start button, honk a horn, fasten a seatbelt, press a brake pedal, call out potential hazards (or other defensive driving techniques), open a bulkhead door, traverse to the bed of a logistics vehicle, select the appropriate package located in the bed of the logistics vehicle, scan the correct package via package scanner, hand deliver the package to the correct destination, drive to the next stop along a specific route, perform any specific defensive driving technique, or the like.

In some embodiments, the traversing of the bed of a logistics vehicle, selecting (picking) of the appropriate package, the scanning of the correct package via a package scanner, driving to the next stop, and/or the hand delivering of the package to the correct destination can be detected via any suitable sensors. For example, particular embodiments can detect the traversing of the bed of a logistics vehicle by using object detection algorithms to detect the user walking the bed of the vehicle, and/or the opening/closing of the bulkhead door, as described herein. Particular embodiments can detect the selecting of the appropriate package via RFID or other reader-tag sensors. For example, an instruction may be provided for a user to walk past the bulkhead door to obtain a package, with an ID of XY. Each training package in the bed may include a tag that indicates the ID of the package. And the user (or device that the user holds) may be equipped with a tag reader. Accordingly, in response to a tag reader reading a tag at the highest RSSI strength and/or over a time threshold (indicating that the user is carrying the package), particular embodiments determine that this is the package (e.g., package XY) the user has selected. Detecting hand delivering may include using object detection and/or the same reader/tag pairs in shipping destination training environments. To detect whether a user has driven to the correct stop may include monitoring where the user has driven via the turning of the steering wheel 112 and/or user input at any of the training modules with respect to FIGS. 9A through 9i.

Per block 1004, some embodiments detect engagement of the one or more components. In some embodiments, detecting engagement can include receiving a control signal or user input indicative that a particular component has been engaged. In some embodiments, detecting engagement alternatively or additionally include receiving any other indication, such as a TCP/IP message, wired message, or flag that indicates that the user has engaged the one or more components. In some embodiments, "detecting engagement" refers to determining that some action (e.g., a threshold) associated with the one or more components has been met. Alternatively or additionally, "detecting engagement" refers to inferring that user activity associated with the one or more components has occurred. For example, as described above with respect to the seatbelt 110, DIAD 116, and cradle 118, detecting engagement can include detecting that the first and second contacts are touching or a corresponding switch has been opened or closed (a threshold), as a result of such contacts touching. Responsively, particular embodiments infer that a user has fastened the seatbelt 110 and/or placed the DIAD 116 into its cradle 118. Accordingly, the threshold being met and/or the inference of user activity may be included in the detecting of the engagement at block 1004.

Per block 1006, at least partially in response to the detecting at block 1004, some embodiments cause display, at a monitor inside the logistics vehicle, of indicia, where the indicia includes a second instruction for the user to perform a second logistics operation (e.g., a defensive driving technique). Example of this are described with respect to FIGS. 9A through 9i. For example, in response to detecting that the user has fastened a seatbelt, particular embodiments cause presentation of the screenshot 910 and/or the main menu 912 at the monitors 104 and/or 106. The second instruction can alternatively or additionally include an instruction to perform any logistics operation, as described herein.

II. Apparatuses, Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 11:
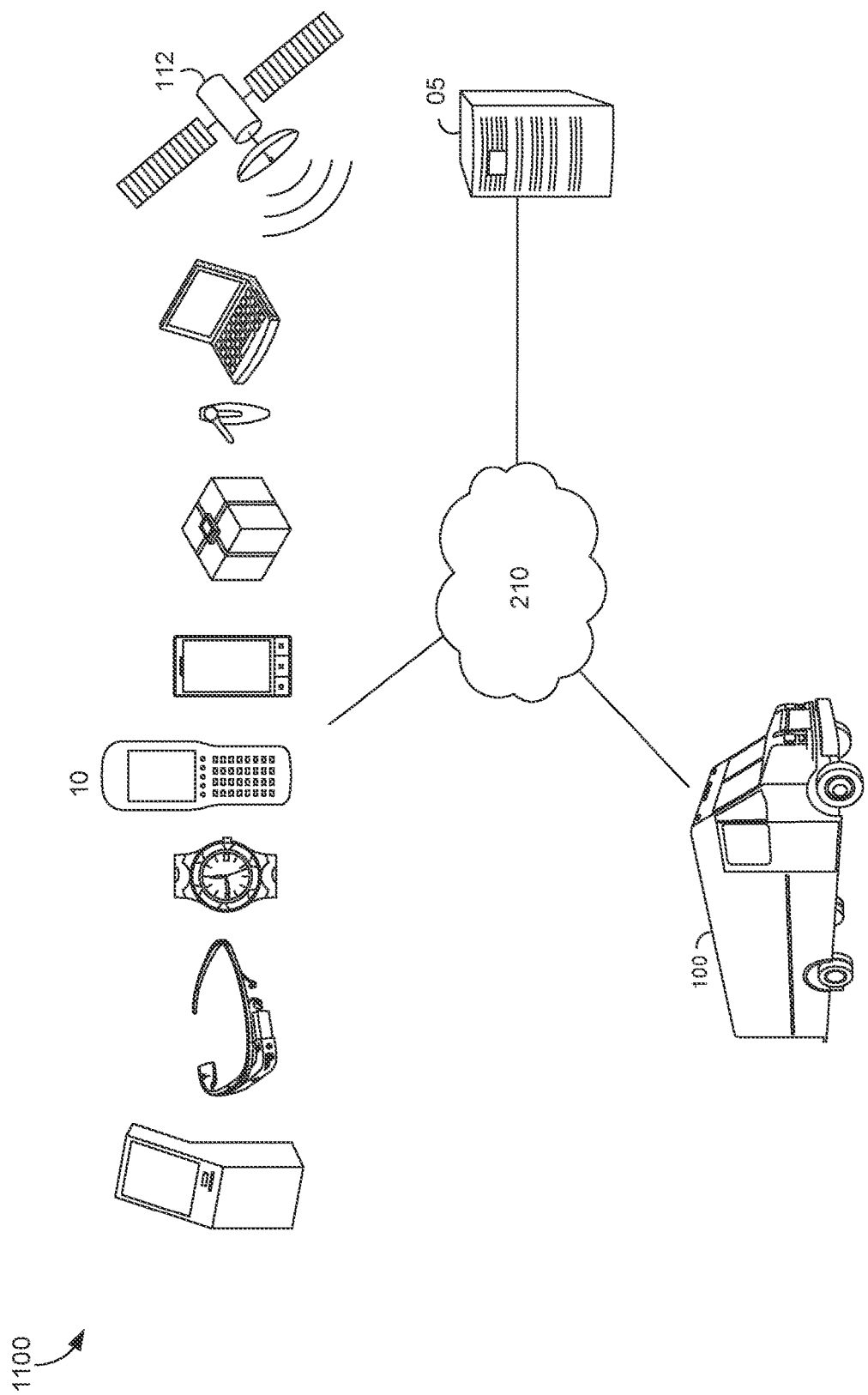
FIG. 11 is a schematic diagram of an example computing environment in which aspects of the present disclosure are employed in, according to some embodiments.

FIG. 11 is a schematic diagram of an example computing environment 1100A in which aspects of the present disclosure are employed in, according to some embodiments. As shown in FIG. 11, this particular computing environment 1100A includes one or more analysis computing entities 05, one or more computing entities 10 (e.g., a DIAD), one or more satellites 12, one or more networks 210, and/or the like. Each of these components, entities, devices, systems, and similar words used herein interchangeably may be in direct or indirect communication with, for example, one another over the same or different wired and/or wireless networks. Additionally, while FIG. 11 illustrates the various system entities as separate, standalone entities, the various embodiments are not limited to this particular architecture. In some embodiments, the components described herein (e.g., DIAD, seatbelt, horn, brake, etc.) associated with the logistics vehicle simulator 100 are included in the environment 1100A without necessarily being coupled to or inside of the logistics vehicle simulator 100.

In various embodiments, the network(s) 210 represents or includes an IoT or IoE network, which is a network of interconnected items that are each provided with unique identifiers (e.g., UIDs) and computing logic so as to communicate or transfer data with each other or other components. In some embodiments, the analysis computing entity 05 is included in the logistics vehicle simulator 100 (e.g., in an engine compartment) and/or performs the process 900 of FIG. 9, and/or any of the functionality described herein.

Figure 12:
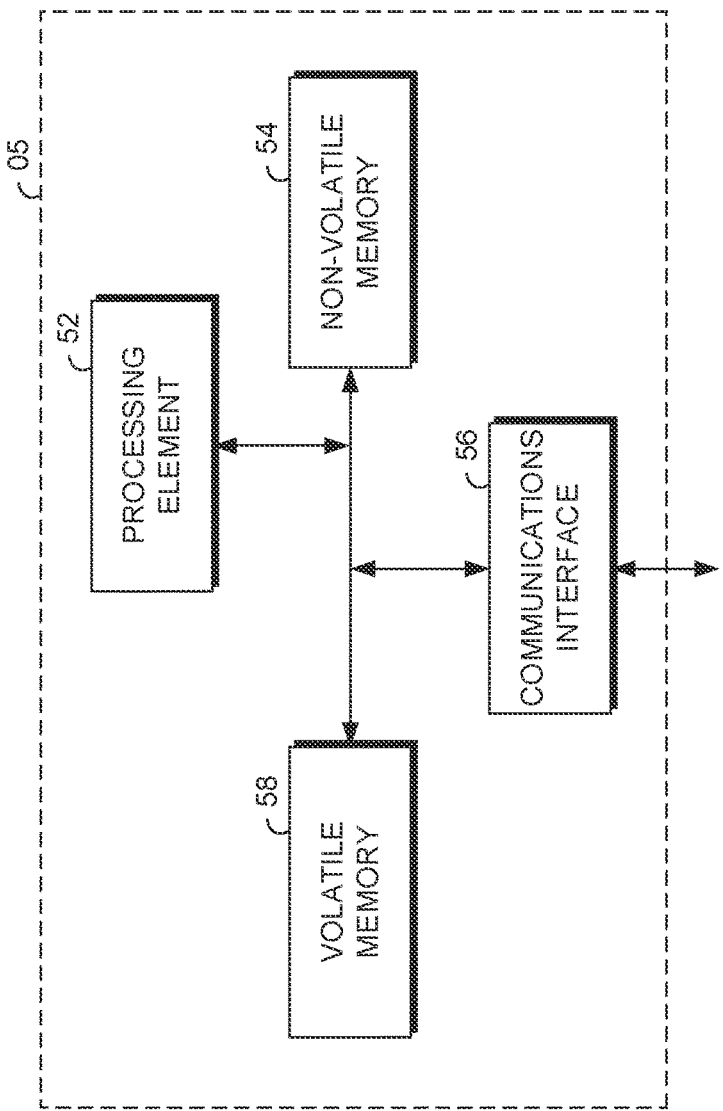
FIG. 12 is a block diagram of an analysis computing entity of FIG. 10, according to some embodiments.

FIG. 12 is a block diagram of an analysis computing entity 05, according to some embodiments. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 56 for communicating with various computing entities, such as by communicating data, content, information/data, and/or similar terms used herein interchangeably that can be transmitted, received, operated on, processed, displayed, stored, and/or the like.

FIG. 12 is a block diagram of an analysis computing entity 05 of FIG. 11, according to some embodiments. As shown in FIG. 12, in particular embodiments, the analysis computing entity 05 may include or be in communication with one or more processing elements 52 (also referred to as processors, processing circuitry, and/or similar terms used herein interchangeably) that communicate with other elements within the analysis computing entity 05 via a bus, for example. As will be understood, the processing element 52 may be embodied in a number of different ways. For example, the processing element 52 may be embodied as one or more complex programmable logic devices (CPLDs), microprocessors, multi-core processors, co-processing entities, application-specific instruction-set processors (ASIPs), microcontrollers, and/or controllers. Further, the processing element 04 may be embodied as one or more other processing devices or circuitry. The term circuitry may refer to an entirely hardware embodiment or a combination of hardware and computer program products. Thus, the processing element 52 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 04 may be configured for a particular use or configured to execute instructions stored in volatile or non-volatile media or otherwise accessible to the processing element 52. As such, whether configured by hardware or computer program products, or by a combination thereof, the processing element 04 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 54, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media 58 (also referred to as volatile storage, memory, memory storage, memory circuitry and/or similar terms used herein interchangeably). In particular embodiments, the volatile storage or memory may also include one or more volatile storage or memory media 58, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 52. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 05 with the assistance of the processing element 52 and operating system.

As indicated, in particular embodiments, the analysis computing entity 05 may also include one or more communications interfaces 56 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Additionally or alternatively, the analysis computing entity 05 may be represented among a plurality of analysis computing entities. For example, the analysis computing entity 05 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 210. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

Figure 13:
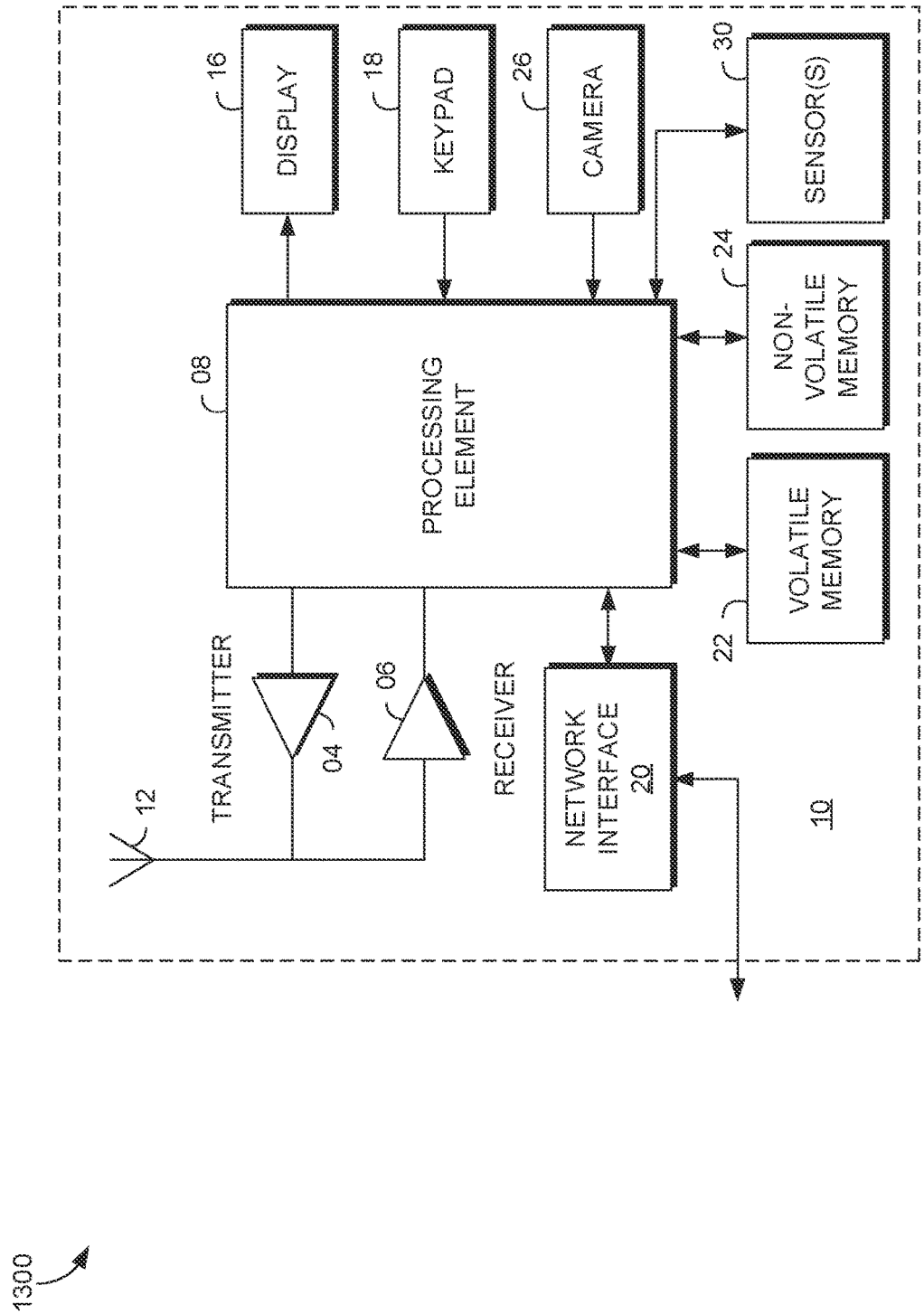
FIG. 13 is a block diagram of a computing entity of FIG. 10, according to some embodiments.

FIG. 13 is a block diagram of a computing entity 10 (e.g., a mobile device) of FIG. 11, according to some embodiments. In certain embodiments, computing entities 10 may be embodied as handheld computing entities, such as mobile phones, tablets, personal digital assistants, and/or the like, that may be operated at least in part based on user input received from a user via an input mechanism. Moreover, computing entities 10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 10 may be utilized as onboard controllers for UAVs configured for picking-up and/or delivering packages to various locations, and accordingly such computing entities 10 may be configured to monitor various inputs (e.g., from various sensors) and generated various outputs. It should be understood that various embodiments of the present disclosure may comprise a plurality of computing entities 10 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 10 that may include one or more components that are functionally similar to those of the analysis computing entity 05. FIG. 13 provides an illustrative schematic representative of a computing entity 10 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 10 can be operated by various parties, including carrier personnel (sorters, loaders, delivery drivers, network administrators, and/or the like). As shown in FIG. 13, the computing entity 10 can include an antenna 12, a transmitter 04A (e.g., radio), a receiver 06 (e.g., radio), and a processing element 08 (e.g., CPLDs, microprocessors, multi-core processors, coprocessing entities, ASIPs, microcontrollers, and/or controllers) that provides signals to and receives signals from the transmitter 04A and receiver 06, respectively. In some embodiments, the computing entity 10 includes one or more sensors 30. In this way, in some embodiments, the computing entity 10 is a special-purpose computer or particular machine. The one or more sensors 30 can be one or more of: a pressure sensor, an accelerometer, a gyroscope, a geolocation sensor (e.g., GPS sensor), a radar, a LIDAR, sonar, ultrasound, an object recognition camera, and any other suitable sensor described herein to map a loading area.

The signals provided to and received from the transmitter 04A and the receiver 06, respectively, may include signaling information in accordance with air interface standards of applicable wireless systems. In this regard, the computing entity 10 may be capable of operating with one or more air interface standards, communication protocols, modulation types, and access types. More particularly, the computing entity 10 may operate in accordance with any of a number of wireless communication standards and protocols, such as those described above with regard to the analysis computing entity 05. In a particular embodiment, the computing entity 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 10 may operate in accordance with multiple wired communication standards and protocols, such as those described above with regard to the analysis computing entity 05 via a network interface 20.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

According to particular embodiments, the computing entity 10 may include location determining aspects, devices, modules, functionalities, and/or similar words used herein interchangeably. For example, the computing entity 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the computing entity 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 10 may also comprise a user interface (that can include a display 16 coupled to a processing element 08) and/or a user input interface (coupled to a processing element 08). For example, the user interface may be a user application, browser, user interface, and/or similar words used herein interchangeably executing on and/or accessible via the computing entity 10 to interact with and/or cause display of information from the analysis computing entity 05, as described herein. The user input interface can comprise any of a number of devices or interfaces allowing the computing entity 10 to receive information/data, such as a keypad 318 (hard or soft), a touch display, voice/speech or motion interfaces, or other input device. In embodiments including a keypad 18, the keypad 18 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 13, the computing entity 10 may also include an camera, imaging device, and/or similar words used herein interchangeably 26 (e.g., still-image camera, video camera, IoT enabled camera, IoT module with a low resolution camera, a wireless enabled MCU, and/or the like) configured to capture images. The computing entity 10 may be configured to capture images via the onboard camera 26, and to store those imaging devices/cameras locally, such as in the volatile memory 22 and/or non-volatile memory 24. As discussed herein, the computing entity 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 26. The contextual data may be stored as a portion of the image (such that a visual representation of the image data includes the contextual data) and/or may be stored as metadata (e.g., data that describes other data, such as describing a payload) associated with the image data that may be accessible to various computing entities 10.

The computing entity 10 may include other input mechanisms, such as scanners (e.g., barcode scanners), microphones, accelerometers, RFID readers, and/or the like configured to capture and store various information types for the computing entity 10. For example, a scanner may be used to capture parcel/item/shipment information/data from an item indicator disposed on a surface of a shipment or other item. In certain embodiments, the computing entity 10 may be configured to associate any captured input information/data, for example, via the onboard processing element 08. For example, scan data captured via a scanner may be associated with image data captured via the camera 26 such that the scan data is provided as contextual data associated with the image data.

The computing entity 10 can also include volatile storage or memory 22 and/or non-volatile storage or memory 24, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 10. As indicated, this may include a user application that is resident on the entity or accessible through a browser or other user interface for communicating with the analysis computing entity 05 and/or various other computing entities.

In another embodiment, the computing entity 10 may include one or more components or functionality that are the same or similar to those of the analysis computing entity 05, as described in greater detail above. As will be recognized, these architectures and descriptions are provided for exemplary purposes only and are not limiting to the various embodiments.

The term "user" described herein may refer to a human user, a robot, an artificial intelligence entity, or a program, such as a service.

Figure 14:
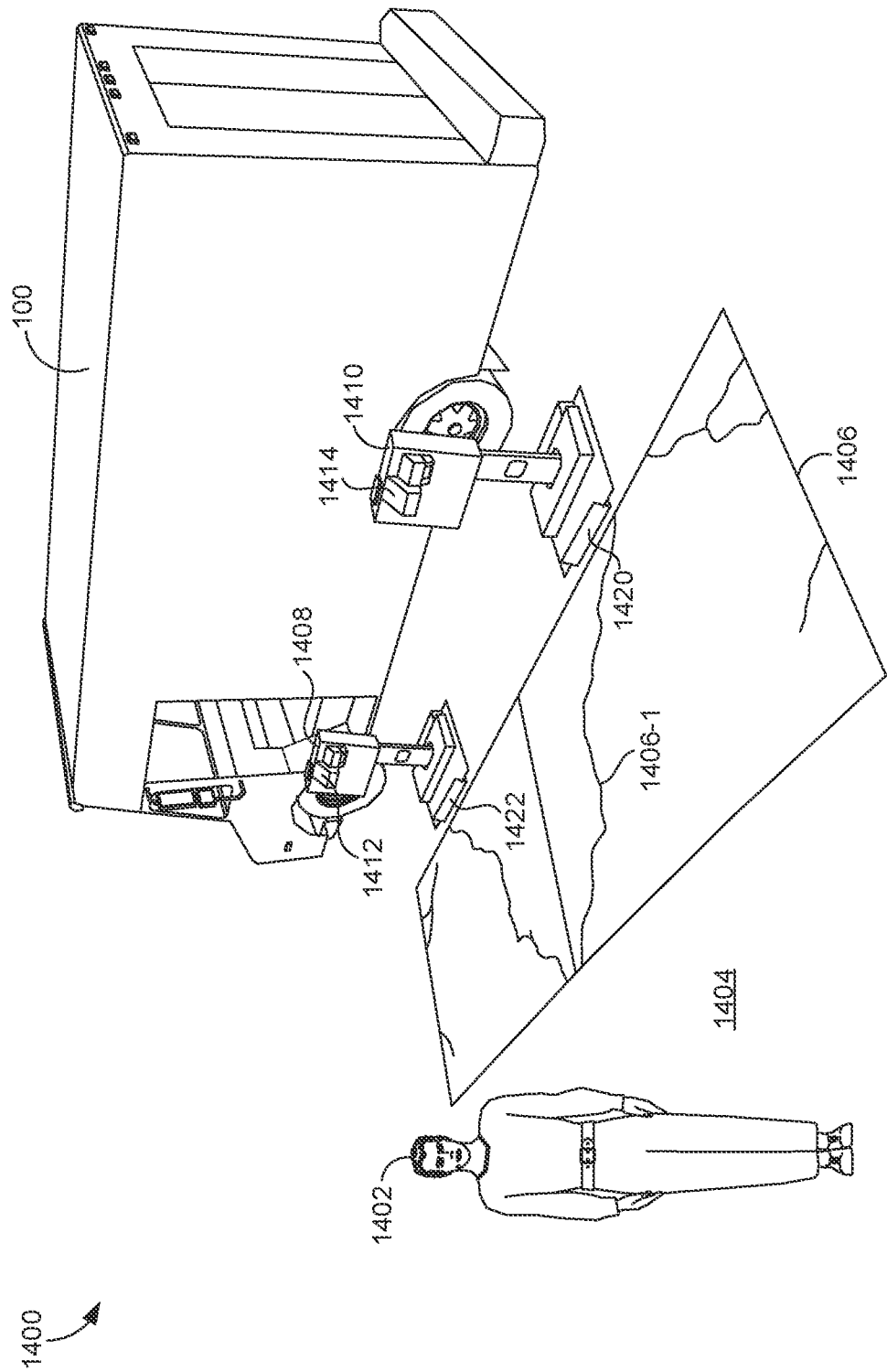
FIG. 14 is a schematic diagram illustrating how a projection of particular surface attributes are used to train logistics personnel before getting into the logistics vehicle simulator, according to some embodiments.

FIG. 14 is a schematic diagram illustrating how an image projection representing particular surface attributes are used to train logistics personnel before getting into the logistics vehicle simulator 100, according to some embodiments. FIG. 14 includes a real-world tangible surface 1402, a user 1402, an image 1406 that is projected or superimposed onto the real-world surface 1404, multiple stand-up lamps 1408 and 1410, each of which include a respective projector 1412 and 1414, and respective sensors 1422 and 1420 (e.g., an infrared sensor).

At a first time, the projectors 1412 and 1414 project, onto the real-world surface 1404 (e.g., a cement surface), the image 1406, which includes the image attributes 1406-1. The image attributes 1406-1 represent cracks on the real-world surface 1404, even though there are no actual real-world cracks on the real-world surface 1404. At a second time subsequent to the first time, the user 1402, as part of a training exercise is prompted (e.g., via audio/visual feedback of a wearable headset) to walk to the logistics vehicle simulator 100. At a third time, the sensors 1422 and 1420 detect the presence of the user 1402 in relation to the image attributes 1406-1 in order to determine whether the user 1402 is, for example, correctly avoids the cracks when walking. It is understood that the projected image 1406 can include any suitable additional or alternative image attributes, such as oil spills (used in a training exercise to avoid oil spills), a walking pathway situated between a lawn and a garden (used in a training exercise to only use the pathway, but not walk on the lawn), or other attributes.

In some embodiments, the sensors 1422 and/or 1420 represent or include infrared sensors that are used to detect when the user 1402 steps on or otherwise touches the image attributes 1406-1 representing the cracks. An infrared (IR) sensor—either active or passive—is an electronic device that measures and detects infrared radiation in its surrounding environment. When a moving object, such as the user 1402, that generates infrared radiation enters the sensing range of a detector of the sensors 1422 and/or 1420, the difference in IR levels between the object and detector (pyroelectric elements) or ambient environment is measured. In other words, when the user 1402 passes through the environment, the temperature at that point of the sensors' field of view will rise from the ambient temperature (user not detected), to body temperature (e.g., of the user 1402 because the user is detected), and presumably back to ambient temperature, which indicates the user 1402 is walking or otherwise moving. In some embodiments, the sensors 1422 and/or 1420 then sends an electronic signal to an embedded computer, which in turn calls a routine or function to determine, where, in the image 1406, the user 1402 has or is being detected. In some embodiments, additional sensors embedded in different locations are used to make this determination. For example instead of only including the sensors 1420 and 1422 in front of the user 1402 as illustrated in FIG. 14, additional infrared sensors are attached to the ceiling, behind the user 1402, and/or to the side of the user 1402. In this way, an entire three-dimensional heat map or density map is derived via a combination of infrared sensors to precisely detect the positioning of any part of the user 1402. Such heat map can, for example, be compared against a map representing the image 1406 (and 1406-1). For instance, such map that represents the image 1406 can be a matrix of ones and zeros where ones represent the image attributes 1406-1 and the zeros represent all other portions of the projected image 1406. If there is an overlap or any positional crossover between the image attributes 1406-1 and the temperature map portion representing the user 1402 over a threshold, then it is detected or inferred that the user 1402 is walking over corresponding cracks.

In some embodiments, the sensors 1422 and/or 1420 alternatively or additionally represent or include object detection cameras that are used to detect when the user 1402 steps on or otherwise touches the image attributes 1406-1 representing the cracks via the detection of different objects. In these embodiments, the sensor 1422, for example, captures near real-time video feed of the environment and the user 1402 walking over the image 1406. Such near real-time video feed also includes video of the image attributes 1406-1. In some embodiments, the sensors 1422 and/or 1420 then cause a transmission of the video data, over a computer network (e.g., the network 210), to a device, such as the analysis computing entity 05, which then feeds the image data to a model, such as a Convolutional Neural Network (CNN) or other computer vision model.

In an illustrative example of object detection functionality, particular embodiments use one or more machine learning models (e.g., a CNN) to generate a bounding box that defines the boundaries and encompasses a computer object representing a feature (e.g., a person, a crack in the ground, a lawn, a walking pathway, etc.) of an image. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in video data. In an illustrative example, in a first video sequence, a first bounding box can be generated over pixels representing the user 140 along with a caption, a "person," and a second bounding box can be generated over an image of the image attributes 1406-1, with a caption, "cracks."

In some embodiments, one or more machine learning models are trained to generate tighter bounding boxes for each object or each action associated with each object (e.g., the user 1402 stepping on the image data 1406-1). In this way, bounding boxes can change in shape and confidence levels for classification/prediction and can be increased based on increased training sessions. For example, the output of a CNN or any other machine learning model described herein can be one or more bounding boxes over each feature of an image, where each bounding box includes the classification prediction (e.g., this object is a person) and the confidence level (e.g., 90% probability).

In some embodiments, the object detection model is first pre-trained on multiple images in order to classify or detect specific objects, such as cracks or people. For example, training can include running multiple images with features labeled or annotated as "cracks" or "person." The model then learns weights or features associated with "cracks" or "person" so as to activate/inhibit corresponding neural network nodes, which corresponds to learning what a crack or person looks like with respect to pixel-level data patterns. In other words, the model minimizes a loss function by iterating, over various epochs, to learn, with accuracy, pixel level patterns of cracks and people. After pre-training, in some embodiments, the model is fine-tuned by learning weights or features associated with "a person walking over or on a crack." In other words, some embodiments activate/inhibit corresponding neural network nodes, which corresponds to learning what it looks like when a person steps on a crack at the pixel level—e.g., a person stepping on the exact image attributes 1406-1 of the image 1406. In this way, based on such training, it can be detected when the user 1402 walks over the image data 1406-1 representing the cracks.

In some embodiments, the projectors 1408 and/or 1414 include or represent one or more pivoting laser projectors, an LED pico-projector, and/or three-dimensional depth sensors. In certain embodiments, at least two and in some instances four depth sensors may be provided, each with a working range between 0.85 and 3.1 meters (alternative ranges may also be provided). In some embodiments, the pivoting laser projector is used for the displaying the projected image 1406. In some embodiments, the three-dimensional depth sensors are configured to map at least a portion of the physical environment that the user 1402 is in.

In some embodiments, alternative to (or in addition) to the stand-up lamps 1408 and 1410, the projectors 1408 and/or 1414 are included in a particular user device (e.g., smart classes, a wearable article, or a mobile device). For example, in some embodiments, the projectors 1408 and/or 1414 are included in wearable glasses or headsets (e.g., Google Glass, HoloLens, Vuzix M-100, SeeThru, Optinvent ORA-S, Epson Moverio BT-300, Epson Moverio BT-2000, ODG R-7, binocular Smart Glasses, monocular Smart Glasses, and the like). In some of these embodiments, the headsets include additional sensors, such as gyroscopes, accelerometers, or other movement sensors, which are configured to determine changes in position or speed of a user such that the a pivoting laser projector projects the projected image 1406 in the correct orientation. For example, if the user 1402 is hanging in a sideways manner, an accelerometer can detect that the associated headset is likewise oriented. This information can be identified by a processor, which causes the pivoting laser projector to responsively transmit a projection in a sideways manner, as opposed to a manner associated with the user 1402 standing on his/her feet. In another example, the user 1402 can be running or otherwise moving at a particular speed, which causes the projector to make the image 1406 project faster/slower based on the speed or acceleration the user 1402 is moving at. In some embodiments, the headsets include depth sensors and use a computer vision model, so as to, for example, map out the environment that user 1402 is in to know where to display the image 1406, which can occur in augmented reality (AR) or mixed reality (MR) use cases. Similar to the model described above, for example, in some embodiments, such models can train on various labeled images of the environment of FIG. 14 with annotations defining an areas within the real world surface 1404 so that the projectors know where to project the image—i.e., always onto the real-world surface 1404.

In some embodiments, the wearable headsets (or the stand-up lamps 1408 and 1410) include a transceiver so as to communicate with the logistics vehicle simulator 100, the computing entities 10, and/or the computing entity 05. For example, in some embodiments, the wearable headsets include a Bluetooth™ or other near-field communication standard to communicate with these components. In an illustrative example, in response to a headset detecting that the user 1402 has or has not stepped on the image attributes 1406-1, the headset, communicates with, via its radio, to an antenna coupled to a computing device within the logistics vehicle simulator 100 to trigger some action, such as triggering an audio signal back to the headset that explains the next training exercise (e.g., "now, grab the handrail before you enter the car"), or an audio signal stating that the user needs to repeat the exercise because they did not avoid the cracks.

Bluetooth™ technology is chip technology that enables seamless data connections between a wide range of devices through short-range digital two-way radio. It is an open specification for short-range communications of data and between both mobile and stationary devices. Bluetooth™ technology is a result of an alliance between mobile communications and mobile computing companies to develop a short-range communications standard allowing wireless data communications at ranges of about 10 meters. Bluetooth™ technology encompasses both a standard communications interface and a low-cost computer chip. It is a cross between the DECT (Digital European Cordless Telephone) and iRDA (infra Red Data Association) technologies, though the direct line of sight requirements of iRDA are avoided. The Bluetooth™ standard incorporates control mechanisms, since each device is assigned a unique address (e.g., 12-byte (MAC)), and to connect to that device, its address must be known. There is also an enquiry feature to search for other Bluetooth™ enabled devices within range.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Claus 1. A system for training a user to perform one or more logistics operations, the system comprising: a logistics vehicle; one or more components coupled to the logistics vehicle, the one or more components including one or more of: a seatbelt, a handrail, a steering wheel, a brake pedal, a mobile device, a mobile device cradle, a key fob, a parking brake, a horn, a turn signal lever, a bulkhead door, an ignition component, and a control button; one or more monitors coupled to a windshield frame of the logistics vehicle, the one or more monitors representing a windshield of the logistics vehicle; one or more processors; and one or more computer storage devices storing computer-useable instructions that, when executed by the one or more processors, cause the system to perform operations comprising: detecting engagement of the one or more components of the logistics vehicle; and, at least partially in response to the detecting, causing display, at the one or more monitors, of indicia, the indicia includes an instruction for the user to perform a logistics operation.

Clause 2. The system of clause 1, wherein the one or more components include side view monitors that represent side view mirrors of the logistics vehicle, and wherein the system performs further operations comprising: subsequent to the causing display of the indicia, generating first video data and causing the first video data to be displayed to the one or more monitors and generating second video data and causing the second video data to be displayed to the side view monitors, the first video data represents the logistics vehicle traversing a street from a perspective of a user looking out of a windshield and the second video data represents the logistics vehicle traversing the street from a perspective of the user looking out of the side view mirrors.

Clause 3. The system of clause 1, or 2, wherein the detecting engagement of the one or more components of the logistics vehicle includes determining that a contact on the mobile device has abutted a contact on the mobile device cradle and inferring that the user has placed the mobile device in the mobile device cradle based on the determining.

Clause 4. The system of clause 1, 2, or 3, wherein the detecting engagement of the one or more components of the logistics vehicle includes determining that a sensor of the handrail has experienced a pressure over a threshold and, based on the pressure being over the threshold, inferring that the user has clasped the handrail.

Clause 5. The system of clause 1, 2, 3, or 4, wherein the detecting engagement of the one or more components of the logistic vehicle includes detecting movement of the bulkhead door outside of a threshold and inferring that the user has opened the bulkhead door based on the bulkhead door moving outside of the threshold.

Clause 6. The system of clause 1, 2, 3, 4, or 5, wherein the instruction for the user to perform a logistics operation includes an instruction for the user to engage in a defensive driving technique.

Clause 7. The system of clause 1, 2, 3, 4, 5, or 6, wherein the instruction for the user to perform a logistics operation includes an instruction for the user to engage a particular component, of the one or more components.

Clause 8. The system of clause 1, 2, 3, 4, 5, 6, or 7, wherein the system performs further operations comprising generating video data and causing the video data to be displayed to the one or more monitors, the video data represents the logistics vehicle traversing a road as part of the logistics operation, and wherein the instruction for the user to perform the logistics operation includes instructing the user to engage in a defensive driving task.

Clause 9. The system of clause 1, 2, 3, 4, 5, 6, 7, or 8, wherein the system performs further operations comprising generating an indicator and causing the indicator to be superimposed over the video data at the one or more monitors, the indicator being associated with the instructing of the user to engage in a defensive driving task.

Clause 10. A computer-implemented method comprising: causing a first message to be generated, the first message includes a first instruction for a user to engage one or more components associated with a logistics vehicle; detecting engagement of the one or more components, the engagement of the one or more components indicates that the user has performed at least a first logistics operation; and at least partially in response to the detecting, causing display, at a monitor inside of the logistics vehicle, of indicia, the indicia includes a second instruction for the user to perform a second logistics operation.

Clause 11. The computer-implemented method of clause 10, wherein the detecting engagement of the one or more components includes detecting that a male end of the seatbelt has been placed in a female end of the seatbelt, and wherein the first logistics operation is the user fastening the seatbelt.

Clause 12. The computer-implemented method of clause 10 or 11, wherein the detecting engagement of the one or more components includes detecting that a brake component has been displaced over a threshold, and wherein the first logistics operation is the user causing the logistics vehicle to stop.

Clause 13. The computer-implemented method of clause 10, 11, or 12, wherein the detecting engagement of the one or more components includes detecting that a button on a key fob has been pressed.

Clause 14. The computer-implemented method of clause 10, 11, 12, or 13, wherein the detecting engagement of the one or more components includes detecting that a horn has been depressed over a threshold, and wherein the first logistics operation is the user honking the horn.

Clause 15. The computer-implemented method of clause 10, 11, 12, 13, or 14, wherein the detecting engagement of the one or more components includes detecting that an ignition component has been activated, and wherein the first logistics operation is the user starting the logistics vehicle.

Clause 16. The computer-implemented method of clause 10, 11, 12, 13, 14, or 15, wherein the second instruction for the user to perform a second logistics operation includes an instruction for the user to engage in a defensive driving technique.

Clause 17. The computer-implemented method of clause 10, further comprising generating video data and causing the video data to be displayed to the monitor, the video data represents the logistics vehicle traversing a road as part of the second logistics operation, and wherein the second instruction for the user to perform the second logistics operation includes instructing the user to engage in a defensive driving task.

Clause 18. The computer-implemented method of clause 17, further comprising generating an indicator and causing the indicator to be superimposed over the video data at the monitor, the indicator being associated with the instructing of the user to engage in a defensive driving task.

Clause 19. A computer-implemented method, a system, or one or more computer storage media. The computer storage media and the system having computer-executable instructions embodied thereon that, when executed, perform a method comprising: causing a first message to be generated, the first message includes a first instruction for a user to engage a first component associated with a logistics vehicle; detecting engagement of the first component, the engagement of the first component indicates that the user has performed a first logistics operation; at least partially in response to the detecting, causing a second message to be generated, the second message includes a second instruction for the user to engage a second component associated with a logistics vehicle; and detecting engagement of the second component, the engagement of the second component indicates that the user has performed a second logistics operation.

Clause 20. The computer-implemented method, the system, or the one or more computer storage media of clause 19, wherein the detecting engagement of the second component includes determining that a bulkhead door has been opened, and wherein the second logistics operation is the user picking a specific parcel out of a bed of the logistics vehicle.

What is claimed is:

1. A system comprising:
   a logistics vehicle;
   one or more components coupled to the logistics vehicle, the one or more components including at least one of: a seatbelt, a handrail, a steering wheel, a brake pedal, a mobile device, a mobile device cradle, a key fob, a parking brake, a horn, a turn signal lever, a bulkhead door, an ignition component, or a control button;
   a monitor coupled to a windshield frame of the logistics vehicle, the monitor representing at least a portion of a windshield of the logistics vehicle;
   a conversion module communicatively coupled to the one or more components and configured to perform operations comprising:
   detecting an engagement of at least one component of the one or more components of the logistics vehicle, and
   at least partially in response to detecting the engagement of the at least one component, converting the engagement into a ground signal;
   a keyboard emulator communicatively coupled to the conversion module and configured to perform operations comprising:
   receiving the ground signal, and
   mapping the ground signal to a keystroke;
   one or more processors communicatively coupled to the monitor and the keyboard emulator; and
   one or more computer storage devices storing computer-useable instructions that, when executed by the one or more processors, cause the one or more processors to perform operations comprising:
   receiving the keystroke,
   mapping the keystroke to a display function, and
   executing the display function to cause display, at the monitor, of indicia comprising an instruction for a user to perform a logistics operation.

2. The system of claim 1, wherein the system comprises side view monitors that represent side view mirrors of the logistics vehicle, and the one or more processors perform further operations comprising:
   subsequent to causing display of the indicia, causing first video data to be displayed to the monitor and causing second video data to be displayed to the side view monitors, the first video data represents the logistics vehicle traversing a street from a perspective of the user looking out of the windshield and the second video data represents the logistics vehicle traversing the street from a perspective of the user looking out of the side view mirrors.

3. The system of claim 1, wherein detecting the engagement of the at least one component comprises detecting that a contact on the mobile device has abutted a contact on the mobile device cradle to infer that the user has placed the mobile device in the mobile device cradle.

4. The system of claim 1, wherein detecting the engagement of the at least one component comprises detecting that a sensor of the handrail has experienced a pressure over a threshold to infer that the user has clasped the handrail.

5. The system of claim 1, wherein detecting the engagement of the at least one component comprises detecting movement of the bulkhead door outside of a threshold to infer that the user has opened the bulkhead door.

6. The system of claim 1, wherein the instruction for the user to perform the logistics operation comprises the user engaging in a defensive driving technique.

7. The system of claim 1, wherein the instruction for the user to perform the logistics operation comprises the user engaging a particular component of the one or more components.

8. The system of claim 1, wherein the one or more processors perform further operations comprising causing video data to be displayed to the monitor, the video data representing the logistics vehicle traversing a road as part of the logistics operation, and the instruction for the user to perform the logistics operation comprises the user engaging in a defensive driving task.

9. The system of claim 8, wherein the one or more processors perform further operations comprising generating an indicator and causing the indicator to be superimposed over the video data at the monitor, the indicator being associated with the user engaging in the defensive driving task.

10. The system of claim 1, wherein the at least one component comprises a power component configured to power a function of the logistics vehicle.

11. The system of claim 1, wherein the at least one component comprises a ground component that is associated with a voltage, and converting the engagement into the ground signal comprises regulating the voltage to generate the ground signal.

12. A method comprising:
   detecting, by a conversion module communicatively coupled to one or more components coupled to a logistics vehicle, an engagement of at least one component of the one or more components, wherein the one or more components including at least one of: a seatbelt, a handrail, a steering wheel, a brake pedal, a mobile device, a mobile device cradle, a key fob, a parking brake, a horn, a turn signal lever, a bulkhead door, an ignition component, or a control button;
   converting, by the conversion module, the engagement to a ground signal;
   receiving, by a keyboard emulator and from the conversion module, the ground signal;
   mapping, by the keyboard emulator, the ground signal to a keystroke;
   receiving, by at least one computer processor and from the keyboard emulator, the keystroke;
   mapping, by the at least one computer processor, the keystroke to an audio function; and
   executing, by the at least one computer processor, the audio function to generate an auditory signal to an audio output coupled to the logistics vehicle to instruct a user to perform a logistics operation.

13. The method of claim 12, wherein the at least one component comprises a ground component that is associated with a voltage, and converting the engagement into the ground signal comprises regulating the voltage to generate the ground signal.

14. The method of claim 12, wherein the engagement with the at least one component comprises the user opening the bulkhead door of the logistics vehicle to move the bulkhead door outside of a threshold, and the auditory signal comprises an indication that the user has selected an appropriate package located in a bed of the logistics vehicle.

15. The method of claim 12, wherein the engagement with the at least one component comprises the user activating the ignition component of the logistics vehicle, and the auditory signal comprises a message to the user asking the user to fasten the seatbelt.

16. The method of claim 12, wherein the engagement with that at least one component comprises the user placing a male end of the seatbelt of the logistics vehicle into a female end of the seatbelt, and the auditory signal comprises a message asking the user to start the logistics vehicle.

17. The method of claim 12, wherein:
   a monitor is coupled to a windshield frame of the logistics vehicle to represent at least a portion of a windshield of the logistics vehicle, and the method further comprises:
      detecting, by the conversion module, a second engagement of at least one second component of the one or more components;
      converting, by the conversion module, the engagement to a second ground signal;
      receiving, by the keyboard emulator and from the conversion module, the second ground signal;
      mapping, by the keyboard emulator, the second ground signal to a second keystroke;
      receiving, by the at least one computer processor and from the keyboard emulator, the second keystroke;
      mapping, by the at least one computer processor, the second keystroke to a display function; and
      executing, by the at least one computer processor, the display function to generate a display on the monitor.

18. A computer-readable medium storing computer-executable instructions that, when executed by computing hardware, configure the computing hardware to perform operations comprising:
   receiving a keystroke from a keyboard emulator;
   mapping the keystroke to a display function;
   executing the display function to cause display on a monitor of indicia comprising an instruction for a user to perform a logistics operation, wherein:
      the monitor is coupled to a windshield frame of a logistics vehicle to represent at least a portion of a windshield of the logistics vehicle,
      the logistics vehicle comprises one or more components that include at least one of: a seatbelt, a handrail, a steering wheel, a brake pedal, a mobile device, a mobile device cradle, a key fob, a parking brake, a horn, a turn signal lever, a bulkhead door, an ignition component, or a control button,
      the keyboard emulator receives a ground signal from a conversion module that is communicatively coupled to the one or more components,
      the keyboard emulator maps the ground signal to the keystroke,
      the conversion module detects an engagement of at least one component of the one or more components of the logistics vehicle, and
      the conversion module converts the engagement to the ground signal.

19. The computer-readable medium of claim 18, wherein the operations further comprise:
   receiving a second keystroke from the keyboard emulator;
   mapping the second keystroke to an auditory function; and
   executing the auditory function to generate an auditory signal to an audio output, wherein:
      the logistics vehicle comprises the audio output,
      the keyboard emulator receives a second ground signal,
      the keyboard emulator maps the second ground signal to the second keystroke,
      the conversion module detects a second engagement of at least one second component of the one or more components of the logistics vehicle, and
      the conversion module converts the second engagement to the second ground signal.

20. The computer-readable medium of claim 18, wherein executing the display function causes display on a side view monitor that represents a side view mirror of the logistics vehicle.

* * * * *